United States Patent [19]
Marchesseault et al.

[11] Patent Number: 5,843,304
[45] Date of Patent: *Dec. 1, 1998

[54] FILTRATION AND TREATMENT SYSTEM

[75] Inventors: Guy Marchesseault, Boxford, Mass.;
John M. Rummler, Kittery Point, Me.;
Heinz Sauk-Schubert, Portsmouth;
Thomas Beal, Barrington, both of N.H.

[73] Assignee: Wastech International, Inc.,
Portsmouth, N.H.

[*] Notice: The term of this patent shall not extend beyond the expiration date of Pat. No. 5,447,630.

[21] Appl. No.: 445,686

[22] Filed: May 22, 1995

Related U.S. Application Data

[63] Continuation-in-part of Ser. No. 53,402, Apr. 28, 1993, Pat. No. 5,447,630.

[51] Int. Cl.⁶ .................................................. B01D 36/02
[52] U.S. Cl. .......................... 210/143; 210/184; 210/192;
210/201; 210/202; 210/203; 210/257.1;
210/258; 210/304; 210/340; 210/407; 210/510.1;
210/180; 210/253; 210/259; 210/260
[58] Field of Search ..................................... 210/184, 192,
210/199, 340, 512.1, 259, 260, 198.1, 253,
185, 186, 407, 791, 769, 200–203, 304,
143, 257.1, 258, 406, 416.1, 510.1, 180,
436, 472; 422/186.3; 110/250, 254, 221;
219/687, 693, 699, 738, 757

[56] References Cited

U.S. PATENT DOCUMENTS

| | | |
|---|---|---|
| D. 356,624 | 3/1995 | Rummler . |
| 506,879 | 10/1893 | Jewell . |
| 506,880 | 10/1893 | Jewell . |

(List continued on next page.)

FOREIGN PATENT DOCUMENTS

| | | |
|---|---|---|
| 0 338 626 | 10/1989 | European Pat. Off. . |
| 0 654 565 A2 | 5/1995 | European Pat. Off. . |
| 2668187 | 10/1991 | France . |
| 3509215 | 9/1986 | Germany . |
| 93 00 534 | 8/1993 | Germany . |
| 4102760 | 11/1994 | Germany . |
| 54-110646 | 8/1979 | Japan ..................................... 210/192 |
| 63-273713 | 11/1988 | Japan ..................................... 110/250 |
| 2 222 095 A | 2/1990 | United Kingdom . |
| 2 243 166 | 10/1991 | United Kingdom . |
| 2 248 858 | 4/1992 | United Kingdom . |
| 2269222 | 2/1994 | United Kingdom . |
| 93/05694 | 4/1993 | WIPO . |

OTHER PUBLICATIONS

Article: Sulfur Lamps—The Next Generation of Efficient Light? (1 page).
Literature on Dri–let portable toilet from Nikken and Americ; 10 pages.
Article in: New Technology Japan; vol. 23, No. 8, Nov. 1995, p. 41, "Flash Dry–Let Toilet with Water Condensor System".
Dielectric Heating Catalytic Converter System for Reducing Cold–Start Emissions, Katsumi Takatsu et al., pp. 69–77.
Analysis of Characteristic of Microwavede Regeneration for Diesel Particulate Filter, Ning Zhi et al., pp. 27–33.

(List continued on next page.)

Primary Examiner—Matthew O. Savage
Attorney, Agent, or Firm—Oblon, Spivak, McClelland, Maier & Neustadt, P.C.

[57] ABSTRACT

A materials treatment system which includes filtration and treatment of solid and liquid components of a material, such as a waste material. A filter or substrate assembly is provided which allows liquids to pass therethrough, while retaining solids. The solids are then incinerated utilizing microwave energy, and the liquids can be treated after passing through the filter element, for example, utilizing a treatment liquid such as an oxidant liquid. The filter assembly can also include an exhaust filter assembly which removes solids or particulate matter from exhaust gasses, with the retained solids/particulates incinerated utilizing microwave energy.

34 Claims, 26 Drawing Sheets

U.S. PATENT DOCUMENTS

| | | | |
|---|---|---|---|
| 1,224,913 | 5/1917 | Ferguson . | |
| 1,303,358 | 5/1919 | Montgomery . | |
| 1,822,021 | 9/1931 | Fuqua | 210/304 |
| 2,308,670 | 1/1943 | Bolton | 210/512.1 |
| 2,566,731 | 9/1951 | Komline | 110/185 |
| 3,277,580 | 10/1966 | Tooby . | |
| 3,495,658 | 2/1970 | Johnson . | |
| 3,523,076 | 8/1970 | Goerz, Jr. et al. . | |
| 3,568,838 | 3/1971 | Appelgren . | |
| 3,629,099 | 12/1971 | Gahmberg et al. . | |
| 3,655,048 | 4/1972 | Pergola . | |
| 3,659,714 | 5/1972 | Valdespino . | |
| 3,669,857 | 6/1972 | Kirkham et al. | 210/192 |
| 3,670,891 | 6/1972 | Allen . | |
| 3,677,404 | 7/1972 | Staffin . | |
| 3,692,186 | 9/1972 | Marzocchi . | |
| 3,700,565 | 10/1972 | Cornish et al. . | |
| 3,782,300 | 1/1974 | White et al. . | |
| 3,819,053 | 6/1974 | Milotich | 210/512.1 |
| 3,829,909 | 8/1974 | Rod et al. . | |
| 3,831,288 | 8/1974 | Stribling et al. . | |
| 3,845,270 | 10/1974 | Widugris, Jr. | 219/757 |
| 3,864,258 | 2/1975 | Richardson et al. . | |
| 3,875,832 | 4/1975 | Mayfield . | |
| 3,922,730 | 12/1975 | Kemper . | |
| 3,924,139 | 12/1975 | Hirose et al. | 210/199 |
| 3,931,012 | 1/1976 | Huse | 210/400 |
| 3,948,774 | 4/1976 | Lindman . | |
| 4,019,021 | 4/1977 | Schladitz . | |
| 4,044,696 | 8/1977 | Marincek . | |
| 4,097,381 | 6/1978 | Ritzler . | |
| 4,203,772 | 5/1980 | Davis, Jr. et al. . | |
| 4,219,415 | 8/1980 | Nassef et al. . | |
| 4,222,130 | 9/1980 | Roberts . | |
| 4,283,210 | 8/1981 | Mochida et al. . | |
| 4,293,357 | 10/1981 | Higuchi et al. . | |
| 4,307,198 | 12/1981 | Oda et al. . | |
| 4,313,233 | 2/1982 | Roberts . | |
| 4,329,162 | 5/1982 | Pitcher, Jr. . | |
| 4,333,833 | 6/1982 | Longley et al. | 210/198.1 |
| 4,340,403 | 7/1982 | Higuchi et al. . | |
| 4,364,760 | 12/1982 | Higuchi et al. . | |
| 4,415,344 | 11/1983 | Frost et al. . | |
| 4,416,675 | 11/1983 | Montierth . | |
| 4,416,676 | 11/1983 | Montierth . | |
| 4,417,908 | 11/1983 | Pitcher, Jr. . | |
| 4,419,108 | 12/1983 | Frost et al. . | |
| 4,420,316 | 12/1983 | Frost et al. . | |
| 4,439,317 | 3/1984 | Jarrell . | |
| 4,472,185 | 9/1984 | Wu . | |
| 4,477,771 | 10/1984 | Nagy et al. . | |
| 4,492,635 | 1/1985 | Stigebrandt . | |
| 4,565,669 | 1/1986 | Collins et al. . | |
| 4,609,430 | 9/1986 | Okamoto . | |
| 4,622,057 | 11/1986 | Chyung et al. . | |
| 4,631,133 | 12/1986 | Axelrod . | |
| 4,761,208 | 8/1988 | Gram et al. . | |
| 4,816,228 | 3/1989 | Yoshida et al. . | |
| 4,855,276 | 8/1989 | Osborne et al. . | |
| 4,889,639 | 12/1989 | Hudgins et al. . | |
| 4,909,986 | 3/1990 | Kobayashi et al. . | |
| 4,949,654 | 8/1990 | Porter . | |
| 4,976,760 | 12/1990 | Helferich et al. . | |
| 4,999,930 | 3/1991 | Kishi et al. . | |
| 5,037,560 | 8/1991 | Gayman . | |
| 5,058,213 | 10/1991 | Kishi et al. . | |
| 5,074,112 | 12/1991 | Walton et al. . | |
| 5,087,272 | 2/1992 | Nixdorf . | |
| 5,145,576 | 9/1992 | Lataillade . | |
| 5,149,399 | 9/1992 | Kishi et al. . | |
| 5,152,074 | 10/1992 | Kishi . | |
| 5,157,340 | 10/1992 | Walton et al. . | |
| 5,191,184 | 3/1993 | Shin | 210/184 |
| 5,194,078 | 3/1993 | Yonemura et al. . | |
| 5,194,303 | 3/1993 | Nigrin et al. . | |
| 5,196,120 | 3/1993 | White . | |
| 5,223,188 | 6/1993 | Brundage et al. . | |
| 5,230,164 | 7/1993 | Kishi . | |
| 5,257,466 | 11/1993 | Kishi . | |
| 5,261,126 | 11/1993 | Kishi . | |
| 5,262,199 | 11/1993 | Desu et al. . | |
| 5,273,719 | 12/1993 | Kishi et al. . | |
| 5,288,306 | 2/1994 | Aibe et al. . | |
| 5,306,675 | 4/1994 | Wu et al. . | |
| 5,308,507 | 5/1994 | Robson . | |
| 5,316,740 | 5/1994 | Baker et al. . | |
| 5,346,722 | 9/1994 | Beauseigneur et al. . | |
| 5,352,444 | 10/1994 | Cox et al. . | |
| 5,357,880 | 10/1994 | Kishi . | |
| 5,388,345 | 2/1995 | Brundage et al. . | |
| 5,393,499 | 2/1995 | Bagley et al. . | |
| 5,398,399 | 3/1995 | Block et al. . | |
| 5,403,519 | 4/1995 | Rittler . | |
| 5,403,548 | 4/1995 | Aibe et al. . | |
| 5,418,982 | 5/1995 | Kishi . | |
| 5,440,876 | 8/1995 | Bayliss et al. . | |
| 5,453,116 | 9/1995 | Fischer et al. . | |

OTHER PUBLICATIONS

Studies on Regeneration of Diesel Exhaust Particulate Filters by Microwave Energy, Zhang Chunrun et al., pp. 155–165.

"SIC as a Substrate for Diesel Particulate Filters, Per Stobbe", pp. 1–15.

"The Knitted Particulate Trap: Field Experience and Development Progress", A. Mayer, pp. 129–141.

"Study of SIC Application to Diesel Particulate Filter (Part 2): Engine Test Results"; Hiroshi Okazoe et al., pp. 121–128.

"Controlled Energy Deposition in Diesel Particulate Filters During Regeneration by Means of Microwave Irradiation"; Frank B. Walton et al., pp. 131–140.

"Microwave Assisted Regeneration of Diesel Particulate Traps"; C.P. Garner et al., pp. 39–47.

"Feasibility of Ceramic Foam as a Diesel Particulate Trap"; J.J. Tutko et al., pp. 15–23.

Anon: "Wastewater System Uses Microwaves"; McGraw–Hill Inc.; Chemical Engineering, vol. 84, No. 3, pp. 77–78, Jan. 31, 1977.

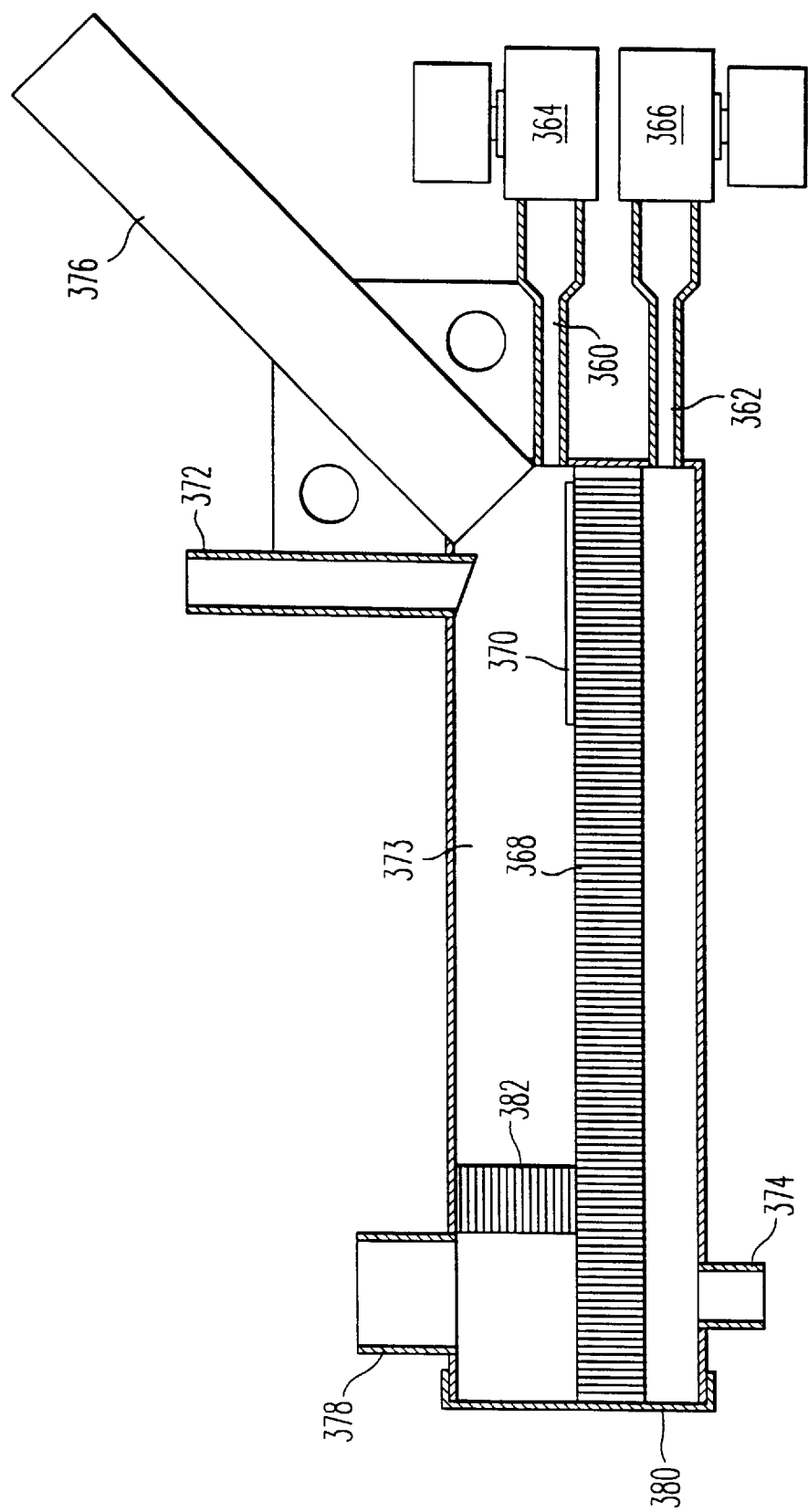

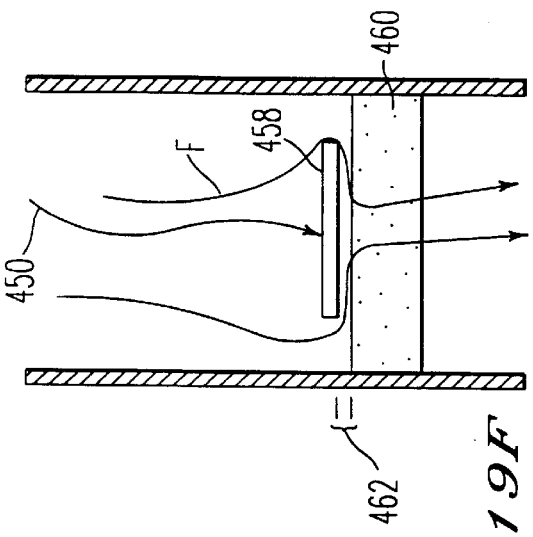
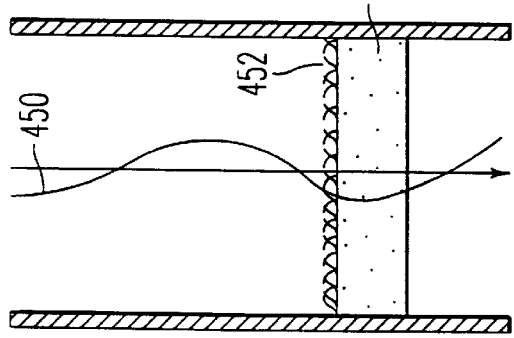
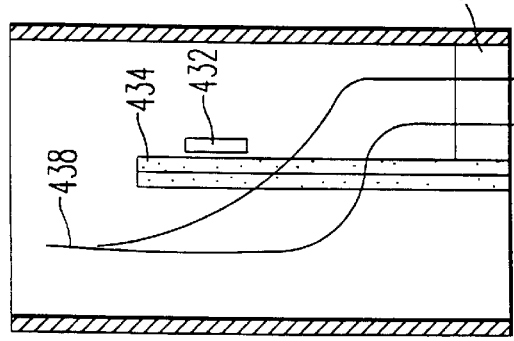
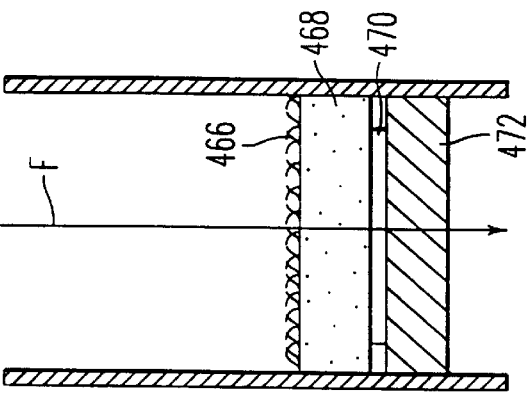
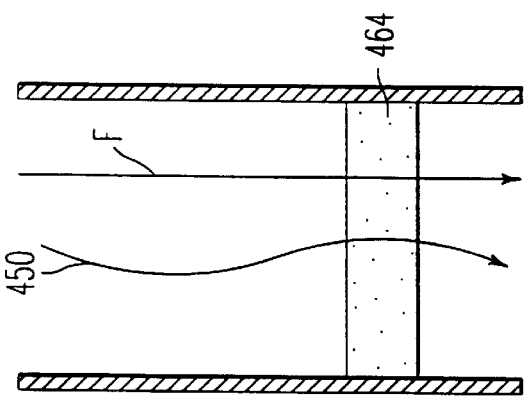

FILTRATION AND TREATMENT SYSTEM

This is a continuation-in-part application of application Ser. No. 08/053,402 filed Apr. 28, 1993, now U.S. Pat. No. 5,447,630.

BACKGROUND OF THE INVENTION

1. Field of the Invention

The invention relates to a method and apparatus for treating materials, particularly materials such as sewage or other waste effluents. In particular, the invention provides a waste treatment process and apparatus in which a high degree of separation is initially provided for separating solid and liquid components, with the solid component thereafter incinerated with little or no resulting solid waste product remnants. The method and apparatus also includes a system for treatment of the liquid component such that the discharged liquid is more environmentally acceptable. The separator aspects of the invention are also applicable wherever material separation is desired.

2. Discussion of Background

Due to overly burdened sewage systems, increased costs associated with waste disposal, and heightened awareness of environmental issues, improved waste treatment systems/processes are greatly needed. For example, in the treatment of household sewage, waste water and associated solids are typically treated in two ways: (1) municipal sewage systems which lead to a central treatment plant; and (2) localized in-ground anaerobic leach fields or cesspools off septic tanks. However, such systems have extremely large volume requirements, and provide less than optimal by-products from an environmental standpoint.

U.S. Pat. No. 4,631,133 proposes an alternative waste treatment arrangement in which sewage passes through a filter, with solid waste material trapped in the filter. A heating element and microwave generator then dry the solid material and burn or incinerate the solids. However, such an arrangement is considerably less than optimal, since the entire sewage volume must pass through the filter, thereby severely limiting the volume capacity of the treatment device. In addition, the need for both microwave and auxiliary heat increases the energy requirements of the treatment device, thereby increasing the associated cost of operation as well as diminishing the effectiveness of the device from an environmental standpoint.

Accordingly, improved waste treatment systems and processes are needed. Ideally, a waste treatment system should be capable of reliably handling significant volumes of waste such as sewage, while having low energy requirements, with any resulting end-products environmentally safe. In addition, the system should preferably be capable of on-site installation for a wide variety of applications, thereby eliminating the need for extensive piping and storage systems.

An improved separation system is also needed for use in a waste treatment system, or wherever materials separation is needed such as in food/beverage processing, in the pulp and paper industry, etc.

SUMMARY OF THE INVENTION

It is an object of the present invention to provide an improved material separator.

It is another object of the invention to provide an improved liquid treatment system.

It is a further object of the invention to provide an improved solid treatment system.

It is also an object of the present invention to provide an improved waste treatment system and process.

It is another object of the present invention to provide a waste treatment system having extremely low energy requirements, thereby improving the cost effectiveness of the device, as well as maintaining the environmental effectiveness.

It is a further object of the present invention to provide a material or waste treatment system which can be readily installed at the point of discharge or creation of the material or waste, such as in a household residence, place of business, medical facility, industrial facility (e.g., a pulp and paper mill), boat or portable toilet. The invention can also be utilized at a treatment facility remote from a discharge/creation location.

It is yet another object of the present invention to provide a waste treatment system and process in which a very high proportion of the solid waste components are initially separated with the solid component having a low liquid content, and with the solid waste thereafter incinerated such that little or no solid waste products remain. The liquid component can be further treated to remove and treat any solid waste remnants, and thereafter treat the liquid such that the final liquid effluent is purified, or at least more environmentally acceptable, e.g., low in particulate and organic content, and free of pathogens.

It is yet another object of the invention to provide a liquid treatment system which can be utilized with the separator and solid treatment, or separately therefrom.

It is another object of the invention to provide a liquid treatment system in which an initial clarification means are provided in which solids or particles are removed or settled from the liquid (e.g. with a rough filter or clarification chamber), and thereafter the liquid is filtered and treated with an oxidant liquid and/or radiation (UV or microwave). Filtration may also be provided before the particle settling.

It is a further object of the invention to provide a microwave arrangement for burning solids (either solids exiting a separator or removed from a liquid by a filter) while the solids are retained on a screen or filter element.

It is yet another object of the present invention to provide an improved separator device for separating components of an incoming flow. In the context of waste treatment, the separator effectively separates liquid and solid components of the waste, such that the exiting solid component includes only a small amount of liquid, thereby enhancing the effectiveness of subsequent treatment of the solid waste, and allowing for efficient treatment of the liquid waste.

It is a still further object of the present invention to provide a waste treatment system which can be easily installed in new construction, as well as in existing structures within an extremely reasonable amount of time (e.g., four to eight man hours), and with low space requirements (e.g., with a solid treatment module for a residence having a size comparable to that of a washing machine).

These and other objects and advantages are achieved in accordance with the present invention in which waste, such as feces, vegetable matter, cellulosic materials etc., is initially introduced into a separator which separates the incoming waste flow into solid and liquid components, such that the solid component includes only a small liquid portion, with the separator requiring no energy. It is particularly preferable to include the separator at the location at which the waste is created (i.e., the location at which the solid is combined with a carriage water) to minimize mixing or emulsification of the solid components within the carriage water. After separation, the solid component or fraction is then treated in a microwave reactor chamber which provides an efficient dehydration and incineration of the solid waste without requiring auxiliary heating, with the incineration particularly effective by virtue of the effectiveness of the separator. In addition, by utilizing a controlled, variable airflow/exhaust flow for the reactor chamber, extremely complete and efficient incineration is attained. Optionally, the liquid component or fraction from the separator is supplied to a liquid treatment module which removes any suspended solid remnants from the liquid, with the solid remnants subjected to a microwave treatment, and with the resulting liquid subjected to additional treatment such as oxidation and/or disinfection and polishing such that a purified liquid effluent is provided which is suitable for discharge into a municipal sewage system, a waterway, evaporation in a settling pool, injection into a subsurface percolation/irrigation bed and possibly for irrigation or swimming pool use (i.e., the system is capable of providing a discharge liquid requiring no further treatment).

Although the various components of the system and process of the present invention are particularly desirable in combination for treating waste such as sewage, it is to be understood that various components or subsystems have advantageous utility for a wide variety of applications, and further, that all components of the system are not required for providing an improved waste treatment system. For example, as will be discussed further hereinafter, the waste treatment system essentially includes a solid treatment module and a liquid treatment module, however, the solid treatment module can be utilized without the liquid treatment module, since separation and treatment of the solid waste components nevertheless provides improved waste handling, such that a discharge of the liquid into, for example, a municipal sewer system is less burdensome on the municipal sewer system.

BRIEF DESCRIPTION OF THE DRAWINGS

A more complete appreciation of the invention and many of the attendant advantages thereof will become readily apparent from the following detailed description, particularly when considered in conjunction with the drawings in which:

FIGS. 19A–19F are microwavable filter assemblies which can be utilized in the liquid and/or solid treatment system of the present invention;

DESCRIPTION OF THE PREFERRED EMBODIMENTS

Figure 1:
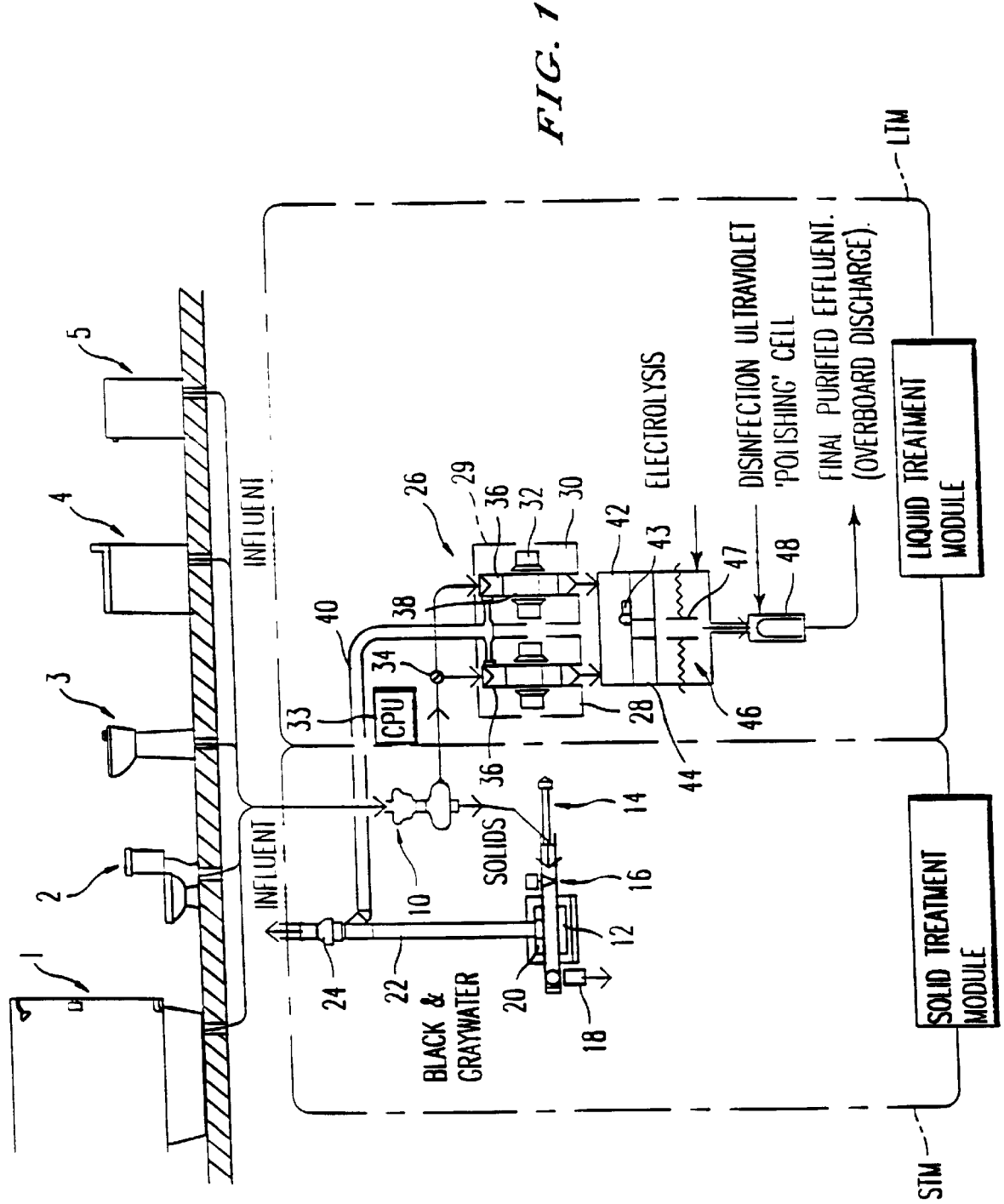
FIG. 1 is an overall schematic of a waste treatment system of the present invention, illustrated in the context of a household residence.

Referring now to the drawings, wherein like reference numerals designate identical or corresponding parts throughout the several views, an initial appreciation of the present invention will become readily apparent from FIG. 1. The system as shown in FIG. 1 can be utilized for handling and treating waste from a variety of sources. In the context of residential use, such sources can include a bathtub or shower 1, toilet 2, lavatory or kitchen sink (which may include a significant amount of vegetable matter associated with a kitchen sink having a garbage disposal) 3, dishwasher 4 and clothes washer 5. It is to be understood that the residential sources shown in FIG. 1 are provided merely as an example, since the system and process of the present invention can be advantageously used in a wide variety of environments which may have different sources of waste, or different proportions of waste, such as in an office building (which may have a greater proportion of toilet waste and little or no waste from bathtubs or clothes washers) or restaurants (which may have a greater proportion of water including vegetable matter). In addition, some components, such as the separator 10, may have advantageous uses other than waste handling, i.e., wherever separation of solids and liquids is desired. More particularly, the separator can be utilized wherever it is desired to separate materials, including solids and liquids. For example, in the beer industry, such a separator can be utilized after washing of hops to separate the hops from the washing water. The separator can also be utilized to separate usable pulp, pulp fiber or wood chips from liquids/sludge discharged from a pulp and paper mill. Of course, the separator has a wide variety of applications.

As discussed earlier, all components of the system are not necessary to provide beneficial waste treatment. In particular, as shown in FIG. 1, the system essentially includes a solid treatment module, STM, demarcated by the section enclosed in broken line at the left of FIG. 1, with a liquid treatment module, LTM, demarcated by the broken line at the right of FIG. 1. If desired, the solid treatment module can be installed without the liquid treatment module, with the system nevertheless being beneficial in providing a less burdensome effluent by virtue of the removal and treatment of the solid waste. The STM and LTM can be constructed as modules which can be easily installed, for example in a residence, requiring a relatively small amount of labor, for example on the order of four to eight man hours. The separate modular construction of the solid treatment module and liquid treatment module can also be desirable, since the liquid treatment module could be installed subsequent to the solid treatment module as the homeowner's budget allows, or as waste treatment requirements change. Of course, the solid and liquid treatment modules can also be marketed as a single system.

Still referring to FIG. 1, it will be appreciated that all of the influents to the treatment system drain to a common drain, which then enters a separator 10, which will be described in further detail hereinafter. Significantly, the separator 10 requires no energy, but nevertheless effectively separates solid and liquid components, with the solid component treated by the STM, and the liquid component (optionally) treated by the LTM. The solid component contains a very small amount of liquid, however is typically not completely free of liquid, which is actually beneficial, since the presence of a very small portion of liquid allows for more effective utilization of microwave treatment in a microwave reactor chamber 12. However, since the separator 10 is extremely effective in separating the liquid and solid components, excessive energy is not wasted in drying the solid components.

After the solids exit the separator 10, they are periodically fed into the microwave reactor chamber 12 utilizing a feed ram 14, with a motorized ball valve 16 allowing for the intermittent introduction of solids, while preventing backflow of any by-products of the microwave treatment. As shown at 18, an outlet for ash remaining after the microwave treatment can be provided, such that any small portions of ash can be delivered and retained in an ash receptacle. However, in accordance with an unexpected result of the present invention, it has been found that for typical residential use, almost no ash remains for disposal after the microwave treatment, since the combined use of the separator 10 and the microwave treatment has proven to be even more effective than anticipated. For example, in testing the system in a residence having a family of four, only one teaspoon of ash remained after treatment of solid waste for a one month period. The remaining solid or ash after treatment thus amounts to only 0.1% of the influent solid volume or less. Thus, the provision of an ash outlet 18 is optional, however is shown in FIG. 1, since it may be desirable for certain applications.

A ceramic particulate "scrubber" or filter is provided as shown at 20, such that minute airborne ash particles are removed from the exhaust flowing from the reactor chamber 12 to the exhaust vent pipe 22. The exhaust vent 22 can be, for example, a three inch diameter PVC pipe, with the flow rate of the exhaust controlled by a variable speed exhaust fan 24.

As will be discussed hereinafter, in accordance with another significant aspect of the present invention, the flow rate of the exhaust provided by the variable speed exhaust fan 24 is controlled to promote more optimal incineration in the microwave chamber. Thus, during the initial stages of microwave treatment, a lower amount of exhaust flow is provided such that heat can be retained and temperatures increased in the microwave reactor in order to dehydrate the solid material and initiate burning or incineration, while after temperatures are sufficient to initiate incineration, the speed of the exhaust fan is increased, thereby increasing the volume flow of the exhaust, and thus increasing the air inflow to provide sufficient oxygen for optimal and complete incineration. Thus, one of the many significant aspects of the present invention resides in the use of a variable speed exhaust which is controlled in correspondence with the operation of the microwave reactor chamber and the incineration process. Not only does such an arrangement promote more effective incineration such that ash remnants are essentially negligible, but also, the solid treatment module is extremely energy efficient, and supplemental heating elements are not necessary, since the entire incineration process can be accomplished utilizing microwaves. In fact, the energy requirements for the solid treatment module have proven to be even less than was initially anticipated for typical residential use.

Continuing with FIG. 1, the liquid treatment module receives liquids from the separator 10. The liquids will typically include blackwater (i.e., liquids including fecal matter) and graywater (e.g., liquids from kitchen sinks which may include vegetable matter, or liquids from a clothes washer, etc.). Although the separator 10 removes most of the solids from the influent, the black and graywater includes small particles which are suspended in the liquid such as hair, small vegetable particles, tissue particles and small fecal particles. The small solid remnants are then removed in a dual filter arrangement designated generally by reference numeral 26.

In accordance with another aspect of the present invention, it has been recognized that a pair of liquid treatment filters is desirable since any solid remnants in the liquid can be entrapped in one of the filters, with the entrapped solid or particulate matter periodically subjected to microwave treatment utilizing microwave generators 32. However, during operation of the microwave generators of one of the filter arrangements, e.g. 28, liquid should not be introduced, since introduction of liquid would diminish the effectiveness of the microwave acting upon solid material entrapped in the filter. In addition, introduction of liquid during operation of the microwave generator 32, or even shortly thereafter when the filter arrangement is hot, can cause premature fatigue of the filter arrangement and filter element material, and possibly explosion or fire when the waste liquid enters the hot microwave filter arrangement. Thus, during microwave treatment of one filter arrangement 28, the liquid enters the other microwave filter arrangement 30 and vice versa. The microwave generators 32 can be operated utilizing a timer such that the filter arrangements 28, 30 are subjected to microwave treatment periodically, but at different times. A motorized PVC ball valve 34 is provided upstream of the dual filter arrangement 26, thereby ensuring that the filter to which liquid is directed is cool and the microwave generators of that filter unit are not being operated. Since only a small amount of solids are present in the liquid passing into the dual filter unit 26, only a short microwave cycle, for example five minutes per day per filter, is necessary. A central processing unit (CPU) 33 can also be provided for controlling and coordinating operation of the diverter valve 34 and microwave generators 32, as well as other components of the liquid treatment module.

Thus, the provision of two ceramic microwave filter chambers allows the continuous receipt of liquid waste, while preventing any adverse effects which may result from the introduction of liquid during microwave operation or shortly thereafter. As should be readily understood, the filter units are enclosed utilizing, for example, stainless steel as indicated schematically by broken line 29, to prevent exit of any stray microwaves. Similarly, the microwave reactor chamber 12 for the solid treatment module should be suitably enclosed.

The ceramic liquid filter units include cylindrical, ceramic, microwave transparent casings 36, with ceramic filter material 38 enclosed within the casings 36 for retaining any solid or particulate material therein, while allowing the liquid to pass therethrough. After a given period of use, the solid matter entrapped in the filter material 38 is eliminated by incineration, with any ash remnants thereafter removed by subsequent introduction of liquid passing through the filter material 38. An exhaust vent 40 is provided, which can be operated by the same exhaust fan 24 as the solid treatment module, or a separate fan may also be provided. As discussed earlier, the use of a controlled, variable speed exhaust fan 24 has been recognized as particularly important in providing improved incineration in the solid treatment module. By appropriately sizing the LTM vent pipe 40, adequate control of airflow through the STM can be maintained by the variable speed fan 24 even with vent pipe 40 remaining open, since the air from the pipe 40 can be predicted for a given pipe diameter. Alternatively, a valve could be provided in the pipe 40 during at least part of the STM microwave treatment in order to isolate the controlled airflow through the STM.

The filter media 38 can be formed of a ceramic fabric material which entraps solid matter, without being degraded by the microwave treatment. A porous hard alumina ceramic filter can also be advantageously utilized as discussed hereinafter. It is expected that the filters will require little or no replacement, particularly in view of the avoidance of fatigue provided by the diverter valve and dual filter arrangement. In addition, any minute ash remaining after a microwave cycle is flushed from the filter by subsequent introduction of liquid. It is also contemplated to provide a fresh water back-flushing of the filters for cleaning. Since the amount of solids entering the LTM is much less than that entering the STM, smaller microwave generators can be provided in the LTM. For example, in residential use, the STM can utilize 400 Watt magnetrons or microwave generators, while 100 Watt generators are acceptable for the LTM.

Downstream of the dual filter arrangement 26, a cylindrical holding tank 42 is provided, which includes a dosing siphon and electrolysis oxidant cell arrangement. The liquid exiting the dual ceramic filter arrangement 26 enters the holding tank 42 and is retained in an annular inlet reservoir 44 which extends about the inner periphery of the cylindrical tank 42.

A dosing siphon periodically feeds a predetermined amount of liquid from reservoir 44 for treatment by the electrolysis arrangement 46, including electrolysis plates 47 which act as oxidation cells, to introduce mixed oxidants into the liquid to purify the liquid. The introduction of mixed oxidants can be accomplished with a brine based system. However, in view of the growing disfavor with chlorine (as a carcinogen) it is likely that oxidants which avoid the use of chlorine will be more favorable. The dosing siphon, indicated schematically at 43, includes a float arrangement such that a metered amount of liquid is dosed to the electrolysis arrangement when the reservoir liquid reaches a certain level. An ST 204 dosing siphon available from Orenco Systems, Inc. has been found suitable for this purpose. Electrolysis arrangements have been used in the past, in large scale facilities. However, prior to the present invention, there did not exist a comprehensive treatment system which provides a liquid suitable for electrolysis on a scale suitable for residential use.

Downstream of the holding tank and electrolysis arrangement, an optional disinfection device 48 can be provided which may include, for example, an ultraviolet polishing cell. The final effluent is thus purified, and suitable for discharge into a waterway, for evaporation into a settling pool, or injection into a subsurface percolation/irrigation bed.

Utilizing the optional LTM, liquid effluents are suitable for discharge into waterways, meeting most, if not all, state regulations for such discharges. The liquid could also be utilized for many irrigation purposes. Testing has revealed the liquid to have less than one CFU fecal coli (*escherichia coli*) per 100 ml; less than one P.P.M. suspended solids; turbidity of solids less than one N.T.U.; and no viruses or microorganisms. Chlorine residuals have been measured as 0.24 mg/l–2.75 mg/l, with total organic carbons less than 10 mg/l. It is believed that pH and Nitrogen content will vary with differing influents to the system.

Figure 2:
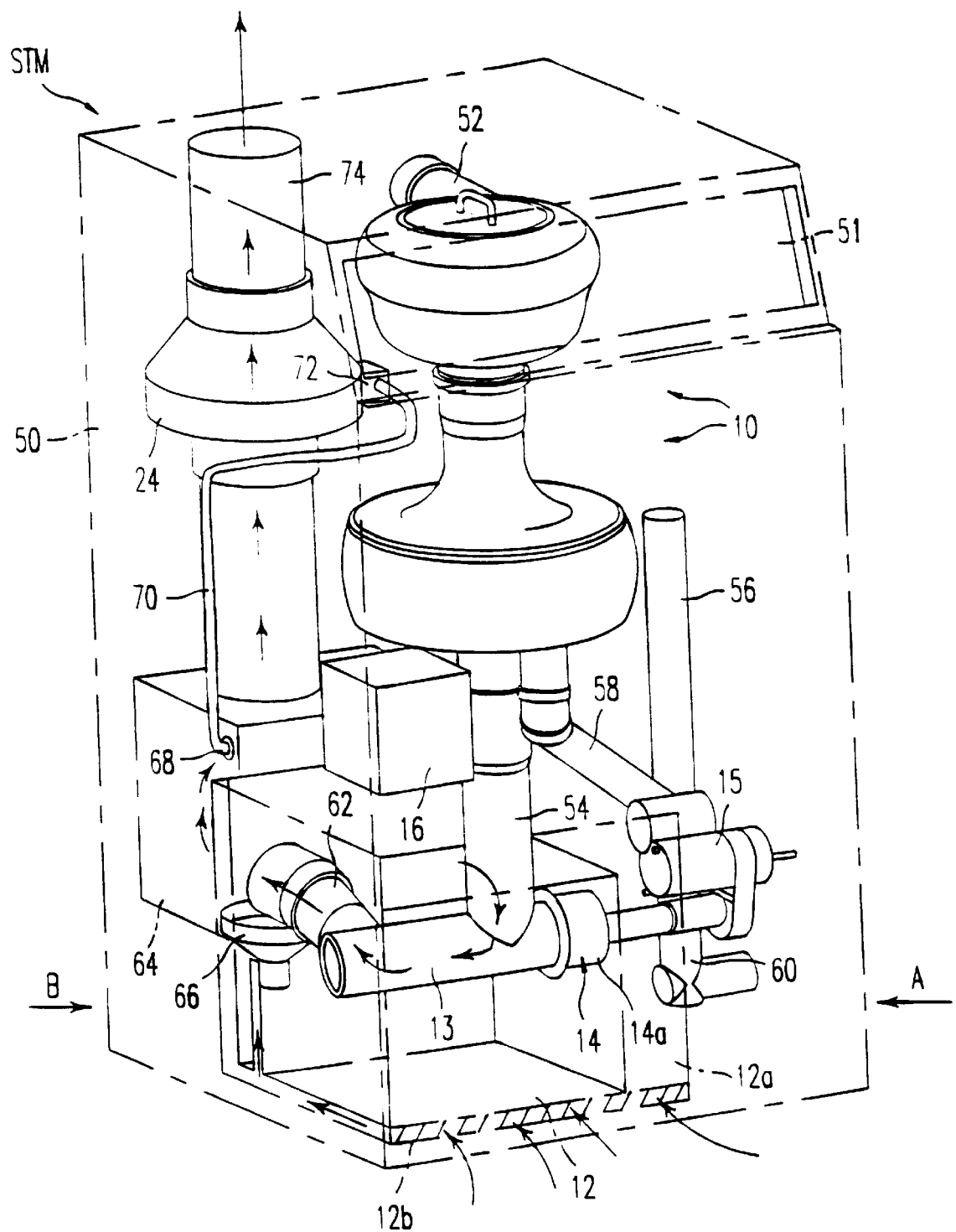
FIG. 2 is a perspective view of a solid treatment module of the present invention.

As discussed earlier, a significant aspect of the present invention resides in the ability to provide a compact system which can be easily installed without requiring vast amounts of labor. Referring now to FIG. 2, it will be appreciated that the solid treatment module (STM) can be provided within a housing 50 of a size comparable to that of a conventional residential clothes washer. For example, the solid treatment module can be housed within a housing 50 which is approximately three to four feet in height, with a base which is substantially square having a side dimension of approximately 30 inches.

As shown in FIG. 2, the influents enter an inlet 52, with solids exiting the separator unit through pipe 54. The pipes can be formed of stock PVC pipe materials sized, for example, of a three inch nominal diameter. Liquids exit the separator 10 through primary and secondary liquid outlet pipes respectively designated at 56, 58. The liquid pipes 56, 58 then merge to a single pipe 60 which passes out of the housing 50 to, for example, a municipal sewage system, or optionally to a liquid treatment module. As discussed earlier, the solid waste component is fed into a microwave reactor chamber 12, with the solid waste held inside a ceramic chamber or fire tube 13 which is microwave transparent. The compartment indicated at 16 houses a motor for a motorized ball valve (with the valve disposed in the adjacent pipe section) for controlling selective feeding of solids toward the reactor chamber 12. A ram actuator 14 is provided, which is operated by a motor 15 and gearbox 14a. The gearbox 14a transforms the rotary output of the motor 15 into reciprocating motion for reciprocating the ram 14 in order to advance the solid waste into the microwave transparent tube 13. A strong ram assembly is particularly important in low-use applications, or where extended periods of non-use can occur, since solids can become hardened over time. A linear actuator available from W.W. Granger Co. (which are commonly used as positioning devices for orienting satellite dishes) has been found to be suitable for this purpose. As discussed hereinafter, the ram actuator may also be eliminated, in favor of a gravity fed microwave chamber.

The solid waste is then subjected to microwaves which are directed upon the tube 13, such that virtually the entire solid waste is incinerated solely by microwave energy, with any ash remnants trapped by an outlet scrubber or particulate filter 62 provided in the passage between the tube 13 and an exhaust manifold 64. As shown at 66, a funnel-type drain is provided at the base of manifold 64 for collecting any condensate which may form as the exhaust gas exits from the tube 13 and begins cooling. The drain 66 can be connected to the liquid treatment module by a suitable piping arrangement, or may be connected to a municipal sewage system.

As shown at 68, a thermocouple or sensor is provided in the exhaust manifold 64, with suitable coupling 70 connecting the sensor 68 to a speed control 72 for the exhaust fan 24. As discussed earlier, in accordance with one aspect of the present invention, by utilizing a controlled, variable speed exhaust fan 24, more complete and efficient incineration of the solid waste is attained. In particular, by utilizing the thermocouple 68, the status of the incineration by microwave energy can be monitored, such that prior to attaining the incineration/combustion temperature, a low exhaust speed, and low exhaust volume flow is provided, thereby allowing the microwave energy to effectively heat the solid waste and increase the temperatures to initiate incineration. Once combustion begins, the sensor 68 causes the controller 72 to increase the speed of fan 24, thereby increasing the exhaust volume flow and correspondingly increasing the amount of air provided to the tube 13 to feed the combustion. A CPU or solid state control panel 51 is provided for controlling various operations in the STM such as valve openings, operation of the ram, and possibly for any interface and/or control of the optional LTM. The control panel can also be equipped with various system sensors, or indicators informing the user of any malfunctions or the need for servicing. The solid state control panel can also provide for control, or adjustment of the control, for the variable speed exhaust fan. By way of example, the variable speed fan can be controlled utilizing a thermocouple such that a flow of 100–150 CFM is provided at temperatures below 220° F.; with 150–300 CFM provided for temperatures of 220°–500° F.; and with 300–400 CFM at temperatures exceeding 500° F. However, different ranges, or a different number of ranges may also be possible within the scope of the present invention.

Any small ash remnants and unburned solid particles become trapped in the filter 62 (which preferably includes a ceramic filter medium) as the air passes through the tube 13 and into the exhaust manifold 64. Preferably, the filter 62 is within the microwave reactor chamber 12, such that any unburned particles remaining after a given microwave cycle can be incinerated in a subsequent microwave cycle.

As should be readily recognized, the solid treatment module STM provides a compact arrangement which can be readily installed, requiring only the connection of the waste influent inlet 52, an exhaust outlet 74, the liquid outlet 60 and condensate drain 66. Thus, the solid treatment module can be installed rapidly, with a target time for a single workman of less than four hours.

As shown in FIG. 2, an outer housing 12a is provided for the microwave reactor chamber 12, with an air inlet grille 12b allowing initial inlet of air for circulating between the housing 12a and chamber 12 as indicated by arrows. The air thus cools the electrical components (e.g., the magnetrons which generate microwaves) and then enters the ceramic tube and finally exits through the exhaust vent via manifold 64.

Figure 3A:
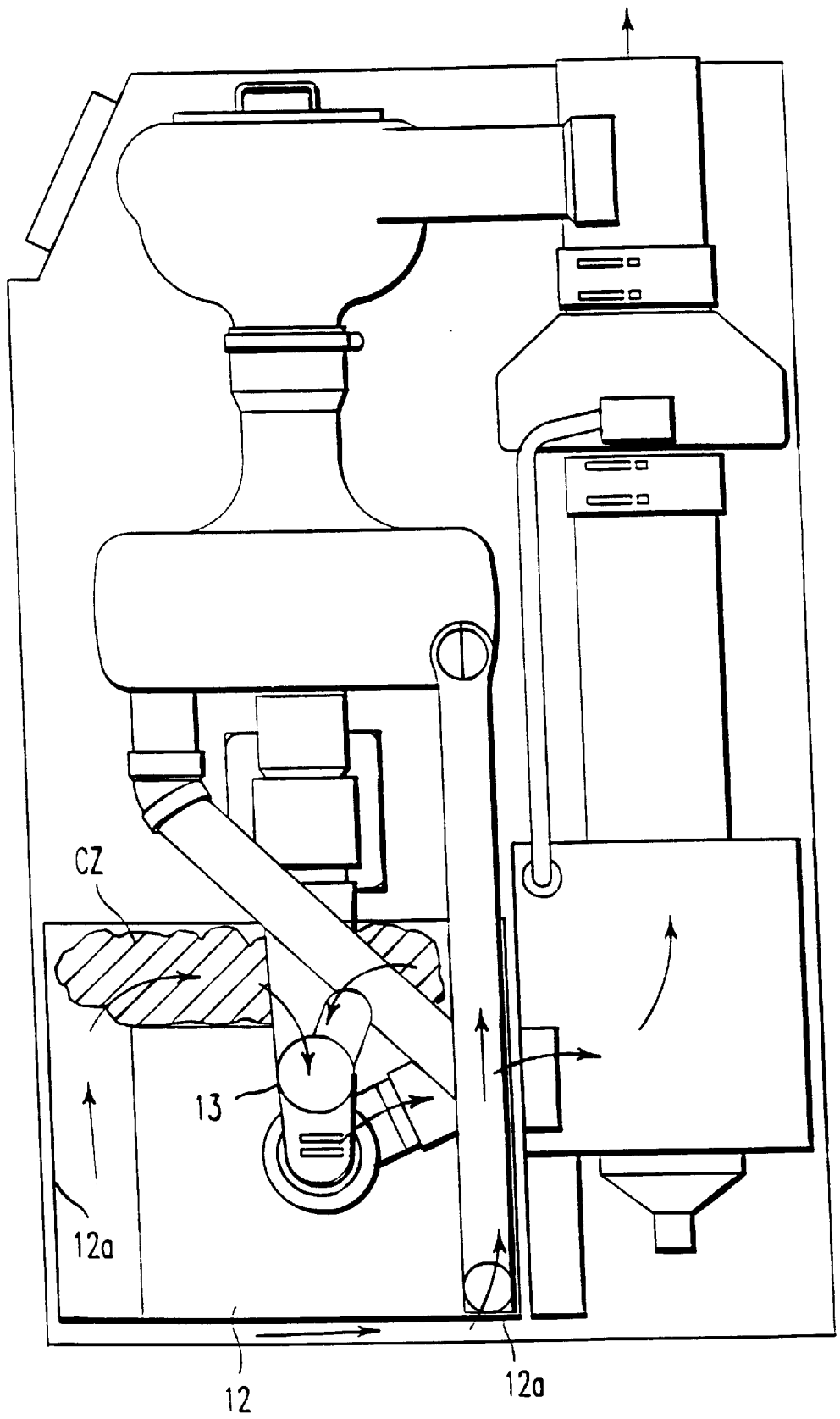
FIGS. 3A–C are respective right, left and rear views of the solid treatment module of FIG. 2.
Figure 3B:
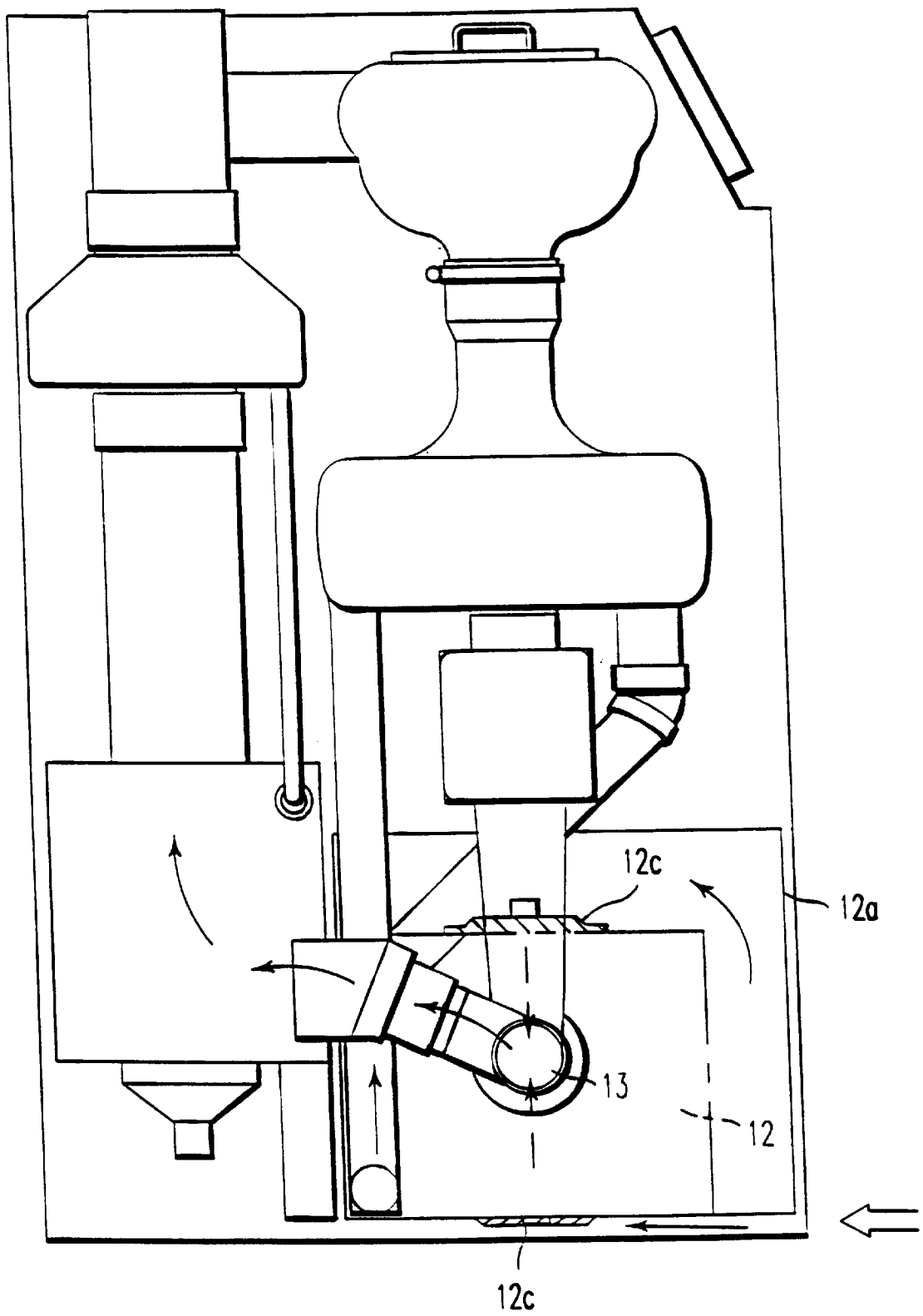

FIG. 3A is a view of the right side of the STM (i.e., viewed from the direction indicated by arrow A in FIG. 2) in order to further illustrate the air/exhaust flow. As shown in FIG. 3A, air passes between the chamber 12 and outer housing 12a, and then enters openings in the pipe feeding the solid waste or the fire tube 13 to provide air for combustion of the solid waste. The shaded region CZ represents a cooling zone at which electronic components can be cooled. FIG. 3B provides a further illustration (viewed from the direction of arrow B in FIG. 2) of the air/exhaust flow. FIG. 3B also illustrates the location of magnetrons 12c (each, e.g., 400 W magnetrons), such that microwaves are directed upon the fire tube 13, with the airflow cooling the magnetrons prior to feeding the combustion/incineration of the solid waste.

Figure 3C:
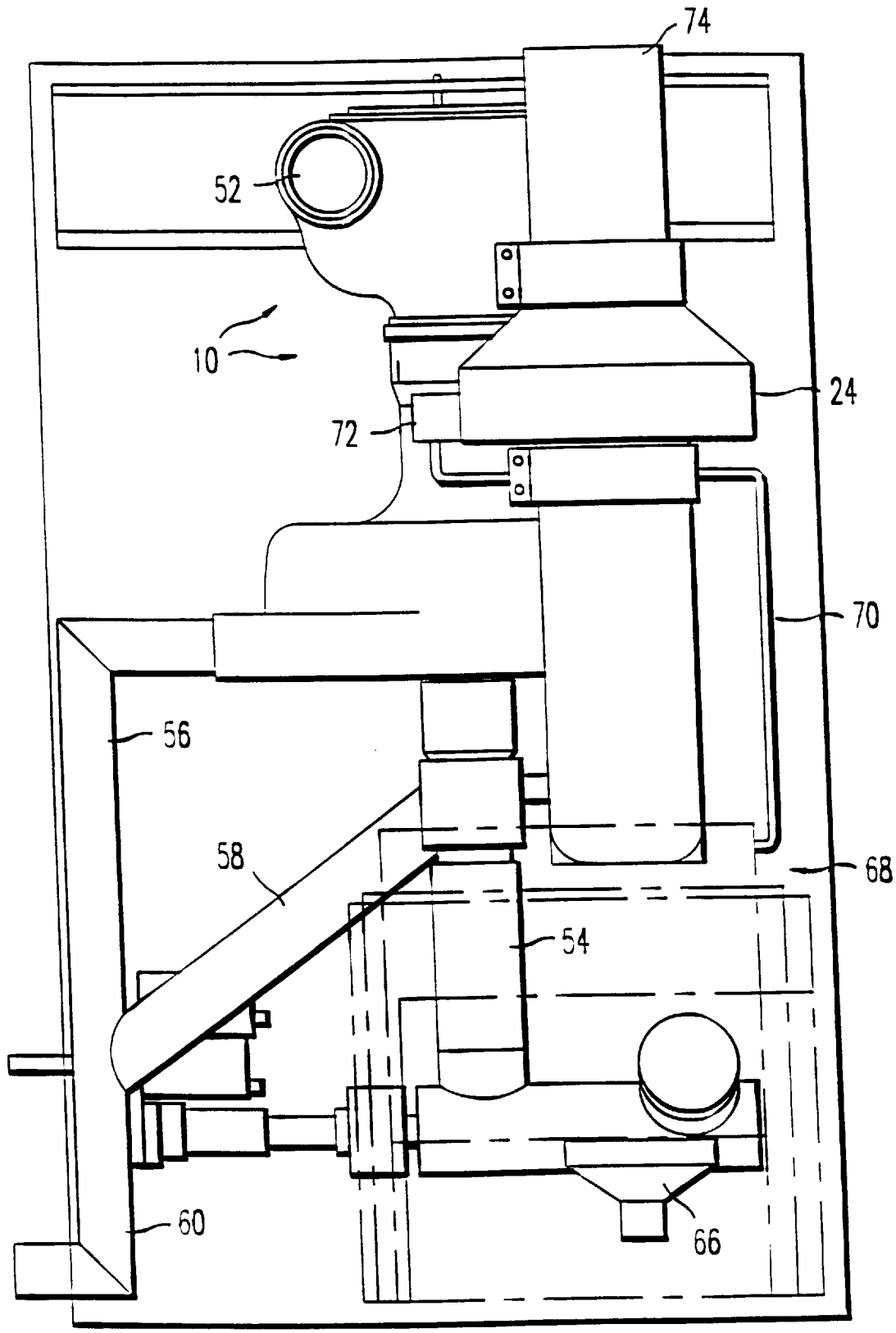

FIG. 3C is a rear view of the arrangement shown in FIG. 2, and is provided merely as a further illustration of the layout of the solid treatment module.

Figure 4:
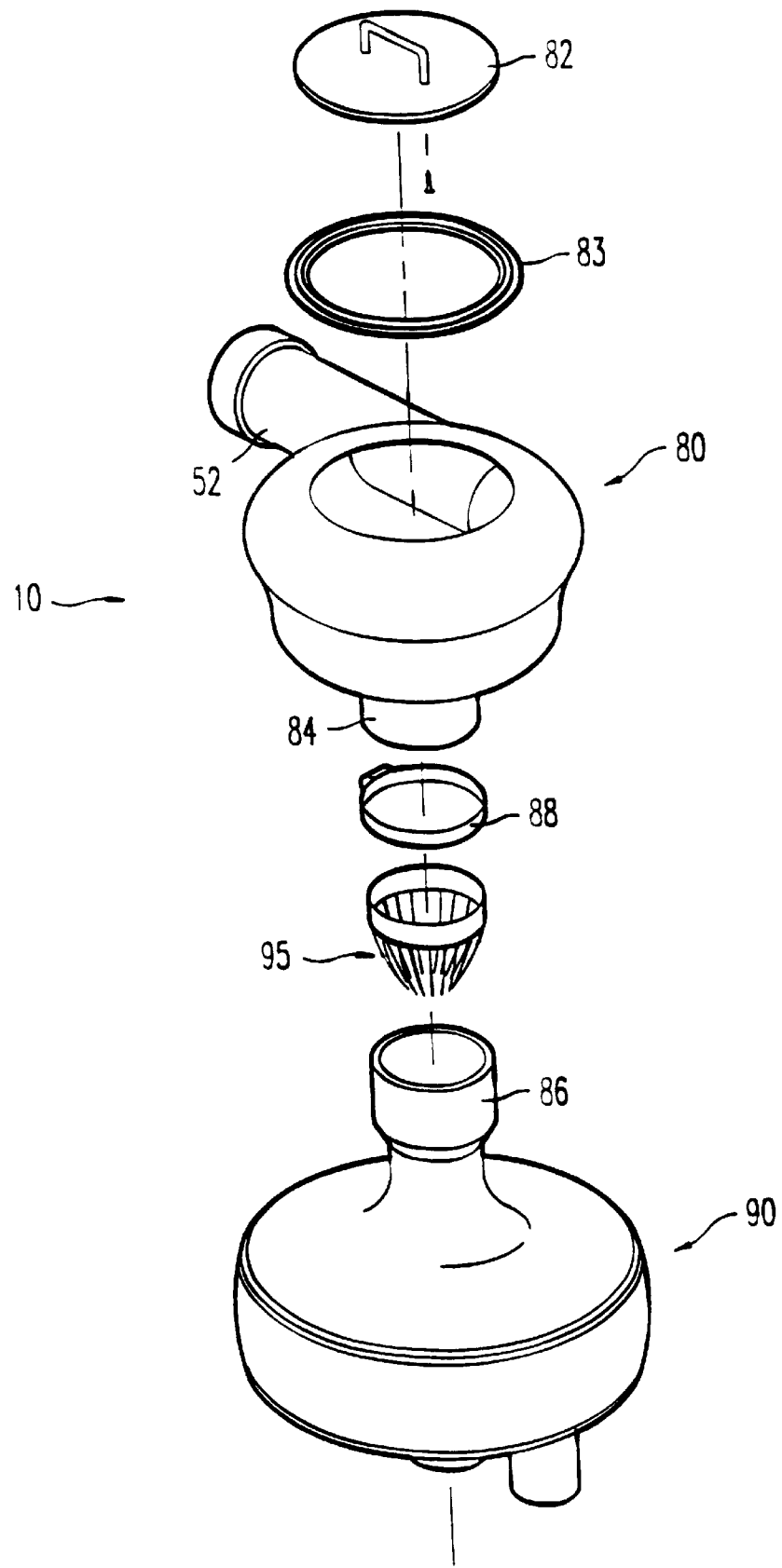
FIG. 4 is a perspective view of a disassembled separator of the present invention.

Referring now to FIG. 4, a perspective view of a disassembled separator 10 is shown. The separator unit 10 includes an upper separator or chamber 80, with a lower housing or lower chamber 90 provided which directs the respective components to the solid outlet and the primary and secondary liquid outlet tubes. A removable cover 82 encloses the upper housing 80 with a gasket seal 83. The cover 82 is desirable to allow for inspection, and removal of undesirable foreign objects from the separator, such as upon the occurrence of an inadvertent introduction of a hairbrush or child's toy into the toilet. The upper and lower portions 80, 90 are readily assembled, with an outlet pipe 84 of the upper portion received by an inlet part of the lower housing 90, and with the portion 86 enlarged to allow the pipe 84 to be received therein. A clamping ring 88 maintains a secure interconnection between the upper and lower housing portions 80, 90. Although the unit 10 could be formed integrally, the use of separate sections can be desirable, since the upper and lower housing parts 80, 90 can be rotated with respect to one another prior to fixing their respective positions with clamp ring 88, thereby aiding connection of the inlet pipe 52 with preexisting drain pipes in a residence or other installation location.

A wire spring or wire guide member 95 is provided between the housing portions, 80, 90, the purpose of which will be explained hereinafter with reference to FIG. 5. Still referring to FIG. 4, it should be appreciated that the inlet pipe 52 supplies influents substantially tangential to the inner surface of the upper housing portion 80. Typically, the influents enter with a substantial velocity, usually by virtue of the gravity flow of a toilet or sink down to a basement location where the unit would typically be installed. A centrifugal flow is thus established as the influent exits the pipe 52 and travels along the inner surface of the upper housing portion 80.

Figure 5:
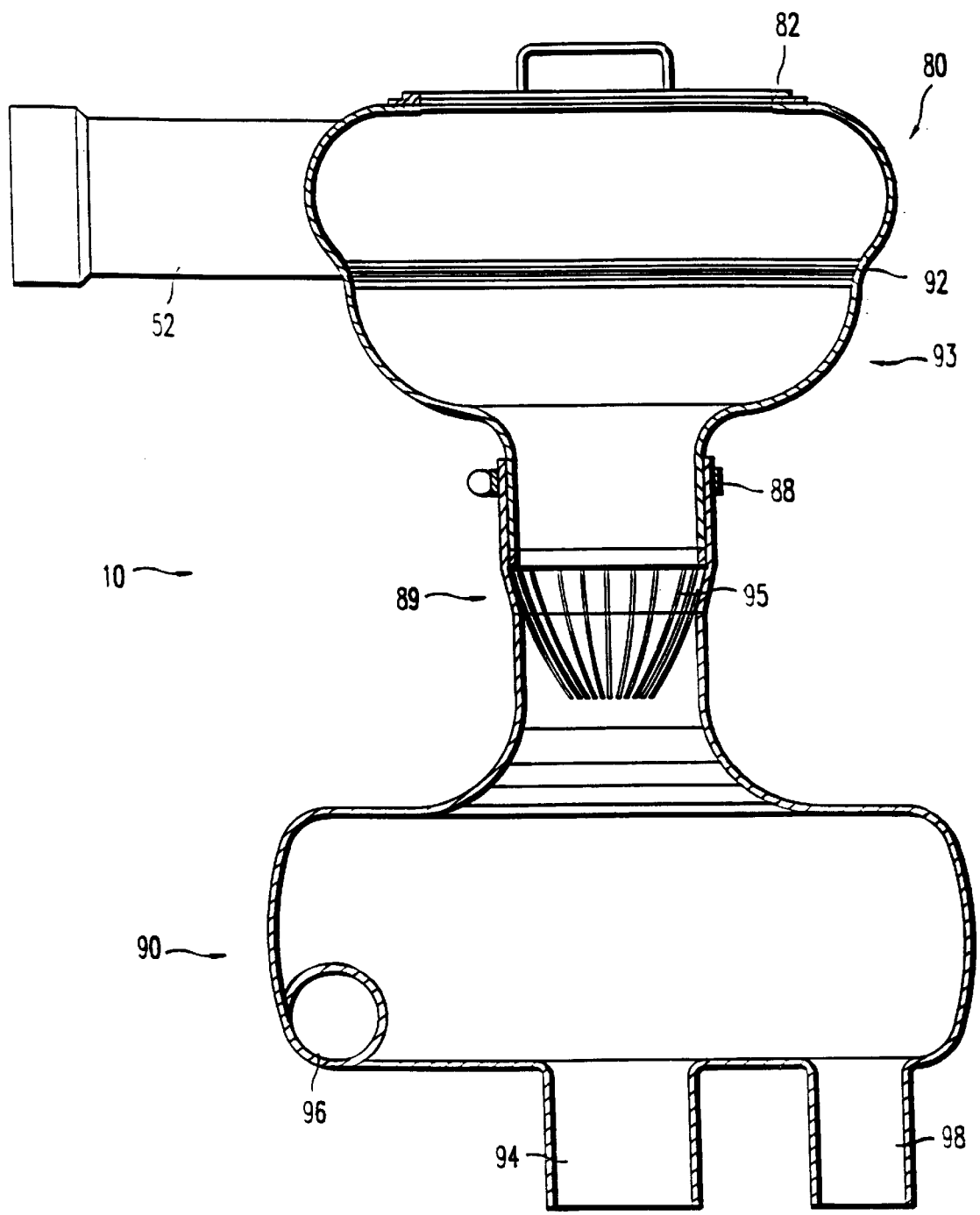
FIG. 5 is a side cross-sectional view of the separator of FIG. 4 in the assembled condition.

Referring now to FIG. 5, a side view of the separator is shown in cross-section, with the separator 10 in the assembled condition. As shown in FIG. 5, the inlet pipe 52 enters the upper housing portion 80 substantially tangential to the inner surface thereof. The influent thus enters the upper housing portion 80 and begins traveling in a downward helical pattern as a result of the velocity which tends to maintain the flow along the inner periphery of the housing, with gravity tending to draw the flow downwardly. Briefly returning to FIG. 4, it should be appreciated that, when viewing operation of the separator from an elevated position (i.e., looking downwardly), a clockwise flow would be observed. If the separator 10 were to be utilized south of the Equator, the inlet pipe 52 would be positioned with respect to the upper portion 80 such that a counterclockwise flow results, such that the flow is coordinated with the earth's rotation (i.e., the flow along the inner surface of the separator 10 is coordinated with the coriolis forces).

Returning to FIG. 5, an inflection or bump 92 is formed by reducing the diameter of the chamber 80 at 92, with the rate of diametric reduction per axial length greater at 92 than portions 93 therebelow. The solid waste drops through exit pipe 94, while the centrifugal forces acting upon the liquid maintain the liquid flowing in a helical pattern along the inner periphery of the separator 10 for exit through the primary and secondary outlets 96, 98. The outlets 96, 98 are respectively connected to the PVC pipes 56, 58 discussed hereinearlier with reference to FIG. 2.

As should be readily apparent, the separator 10 requires no energy, but provides a high degree of separation between liquid and solid components of the materials entering through inlet pipe 52. For example, for a four gallon toilet flush, less than ½ teaspoon of liquid has been found in the solid exit. The velocity of the liquid maintains flow of the liquid along the inner periphery of the separator, with the liquids sheeting along the inner surface. In addition, due to the smooth profile of the inner surface, including the reduced diameter portion at 92, solid waste is not emulsified (which could cause solid wastes to become suspended in the liquid). Below the reduced diameter portion 92, the diameter further reduces, however the rate of diameter reduction per vertical length is reduced in the portion indicated at 93 as compared with the portion at 92. As a result of the construction shown in FIG. 5, the solid waste exits through solid outlet 94 without significantly emulsifying, with the flow of liquid maintained about the inner periphery of the separator for exiting through liquid outlets 96, 98.

Primary and secondary outlets 96, 98 are provided for the liquid components, since it has been recognized that, particularly under large volume conditions, for example where multiple toilets are flushed simultaneously, the primary outlet pipe 96 is insufficient to accommodate the entire liquid flow. Thus, without providing a secondary liquid outlet pipe 98 at the outer periphery of the bottom of the lower housing portion 90, some of the liquid which is not able to pass out through the primary outlet 96 could be allowed to settle down and pass through the solid waste outlet 94. This problem can be solved by the provision of the secondary liquid outlet 98. Thus, the solid waste is allowed to pass through the exit 94 with only a small amount of liquid entrained therein. In addition, as discussed hereinafter, a modified form of the invention provides a larger single liquid outlet for improved flow characteristics, with a cone/funnel outlet provided for collection of the solids.

As discussed earlier, a wire spring or guide wire arrangement 95 is disposed between the upper and lower housing portions 80, 90. The wire spring arrangement 95 assists in separating solids and maintaining the solid waste material separate from the liquid flow which is traveling along the inner periphery of the separator 10. The wire spring arrangement 92 is particularly important for maintaining light solid material, such as toilet paper and other paper products, since such materials can have a tendency to rejoin the liquid and flow along the inner surface of the separator 10.

As shown in FIG. 5, a necked portion 89 is provided between the upper and lower chambers. The necked portion is advantageous for several reasons. First, it provides a joint such that the upper and lower chambers 80, 90 may be rotated with respect to one another (i.e., after releasing clamp 88 or other coupling means). This allows for adjustment of the inlet to the STM to ease installation at various locations. The housing of the STM can include knockouts to allow, e.g., four inlet pipe configurations (i.e., top, right side, rear, left side), and the neck allows the orientation of the inlet 52 to be readily adjusted. In addition, the neck can allow for separation of the chambers 80, 90 for servicing and/or cleaning/replacement of the guide wire ring 95. It has also been recognized that the joint at the neck allows relative movement/positioning of the liquid inlet and outlet pipes, which can be utilized to tune the system for better dynamic flow characteristics, such that the relative positions of the liquid inlet and outlet are most suitable for a particular application (i.e., the flow demands of a particular application).

The necked portion 89 also provides an acceleration zone at which descending liquids (i.e., liquids adhering to the sidewall surfaces of the upper chamber) will "free fall." Thus, the combined centrifugal, coriollis, and syphoning surface tension effects provide a pulling action ensuring separation of the falling liquids from the solids which are guided into the central area of the lower chamber. The necked portion also assists in providing an overall profile for the separator components which can be economically molded, for example of high density polyethylene or other polymer materials.

FIG. 5 was prepared as a scale drawing of an actual working embodiment, however, it is to be understood that varying sizes and dimensions could also be utilized. For residential use, the separator of FIG. 5 has been designed such that it can readily accommodate typical, even somewhat unusual waste flow rates. For example, the separator 10 should be capable for handling simultaneous flushing of three toilets. Further, by way of example, a separator in which the upper chamber 80 has a maximum diameter of 18 inches, with the lower chamber 90 having a maximum diameter of 20 inches, and with the sidewall of the lower chamber 90 having a height of approximately 8 inches, has been found suitable for accommodating and effectively separating such volumes. However, varying dimensions can be utilized depending upon the anticipated volume requirements for a particular installation. For example, where larger volume requirements are needed, the height of the sidewall of the chamber 90 could be increased, while retaining the remaining dimensions. For much greater volume requirements, other dimensions may additionally need modification.

Figure 6:
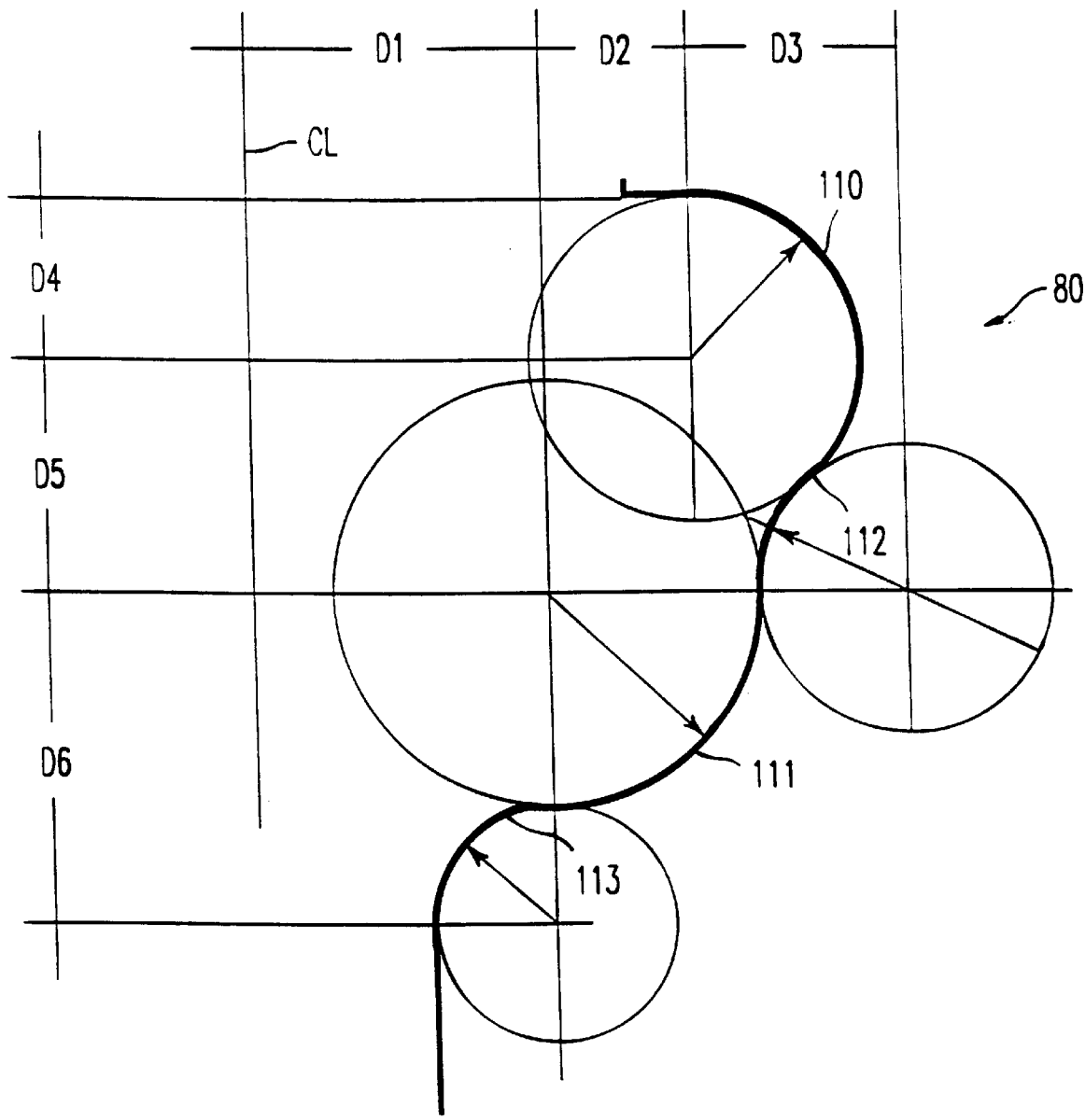
FIG. 6 illustrates the profile of the upper chamber of the separator.

As further illustrated in FIG. 6, the profile of the upper chamber 80 can be formed of essentially four contours 110–113, each of which has a cross-section which is a segment of a circle. As shown, the axes of the contours 110, 111 are within the separator, while the axes of contours 112, 113 are outside the separator. CL designates the center line of the separator, and the respective dimensions D1–D6 can be as follows:

| | |
|---|---|
| D1 | 3.25" |
| D2 | 1.50" |
| D3 | 2.25" |
| D4 | 1.75" |
| D5 | 2.50" |
| D6 | 3.50" |

Of course, the foregoing dimensions are provided as an illustration, and in the interest of completeness, but should not be construed as limiting.

As should be readily apparent from the foregoing, the present invention provides a highly effective system and process for handling materials, particularly in treating waste, thus greatly simplifying waste disposal, while reducing costs, and providing more environmentally acceptable effluents.

Figure 7:
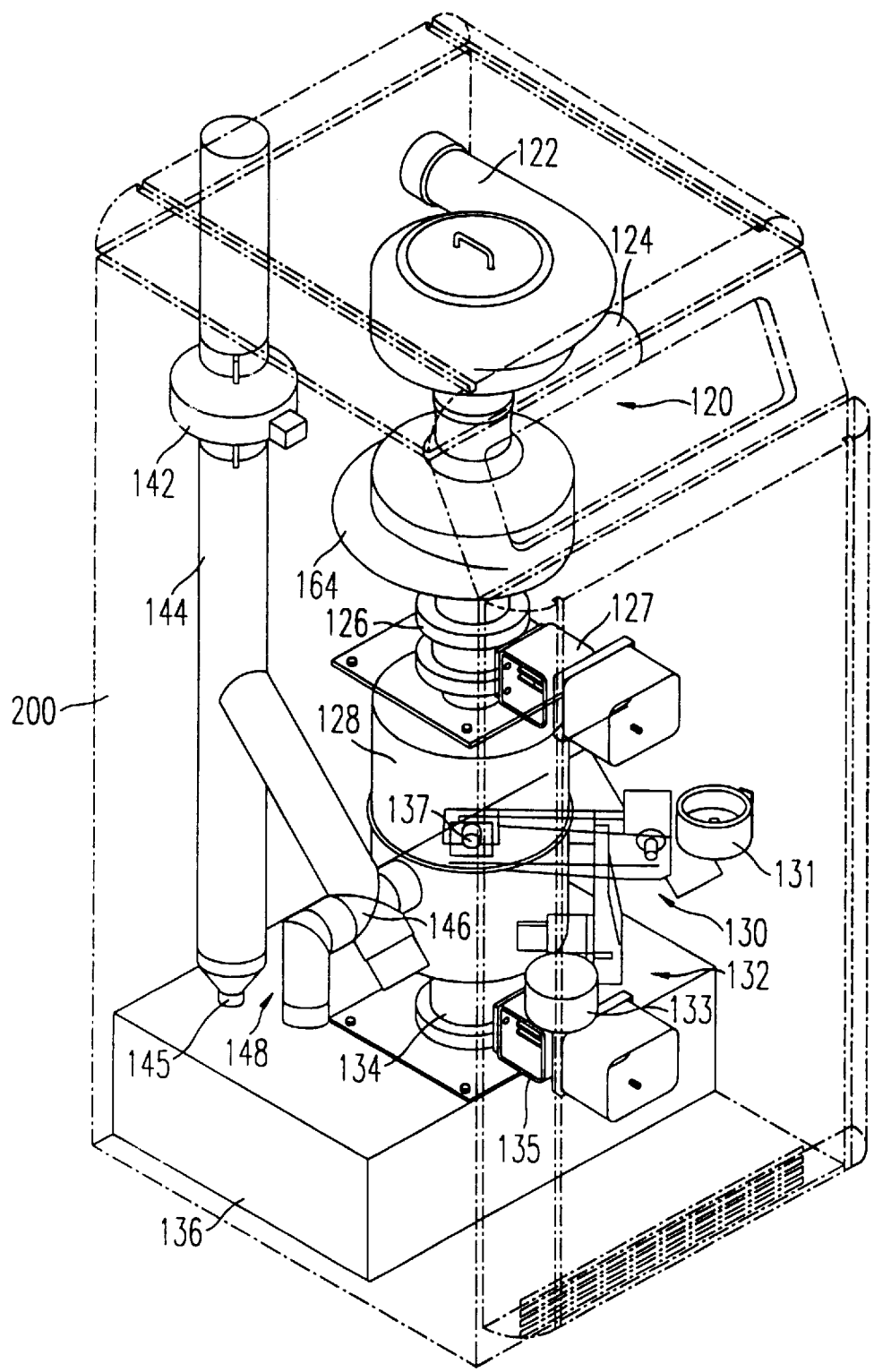
FIGS. 7 and 8 are perspective views of a modified solid treatment system of the present invention.

Referring now to FIG. 7, additional modifications of the present invention will now be described. The arrangement of FIG. 7 includes a modified initial liquid/solid separator 120 (discussed in further detail hereinafter). The material to be separated and treated enters an inlet 122, and the material is separated into a component which is primarily liquid (which exits through the liquid outlet 124), and a component which primarily includes solids (which exits through the bottom of the separator as discussed further hereinafter). The solids then flow to a fire tube or microwave chamber 128, and flow of the solids to the fire tube can be metered by a ball valve 126 disposed between the fire tube 128 and separator 120. Operation of the ball valve 126 can be controlled by a central processing unit or control unit of the treatment system and a motor/actuating device 127. The fire tube 128 can have a cylindrical or drum-like shape, however, other shapes are possible as discussed further hereinafter. Advantageously, the fire tube 128 of the FIG. 7 arrangement is disposed below the separator, such that a ram actuator is not needed to advance the solids into the fire tube. When the ball valve is opened, the solids simply drop into the fire tube 128.

After a periodic collection of solids within the fire tube, the ball valve above the fire tube is closed, and the solids are subjected to microwave radiation to effect a controlled, high temperature burn cycle. In this burn cycle, solids such as organic and inorganic carbon particles, and volatile organic compounds are combusted to $CO_2$ and water vapor (of course the materials being incinerated and the byproducts may vary depending upon the desired use of the system, or the materials to be treated).

Figure 8:
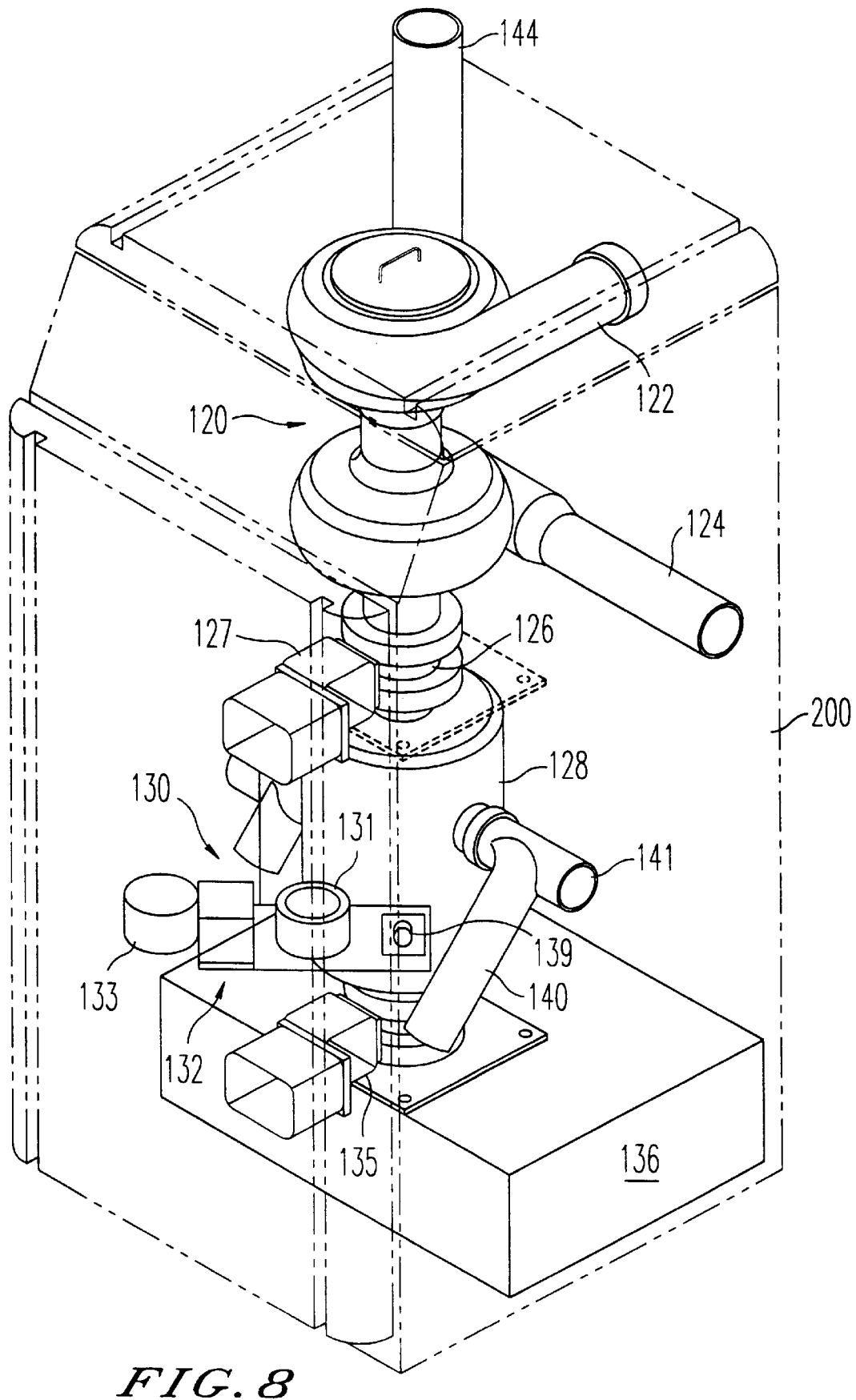
Figure 9:
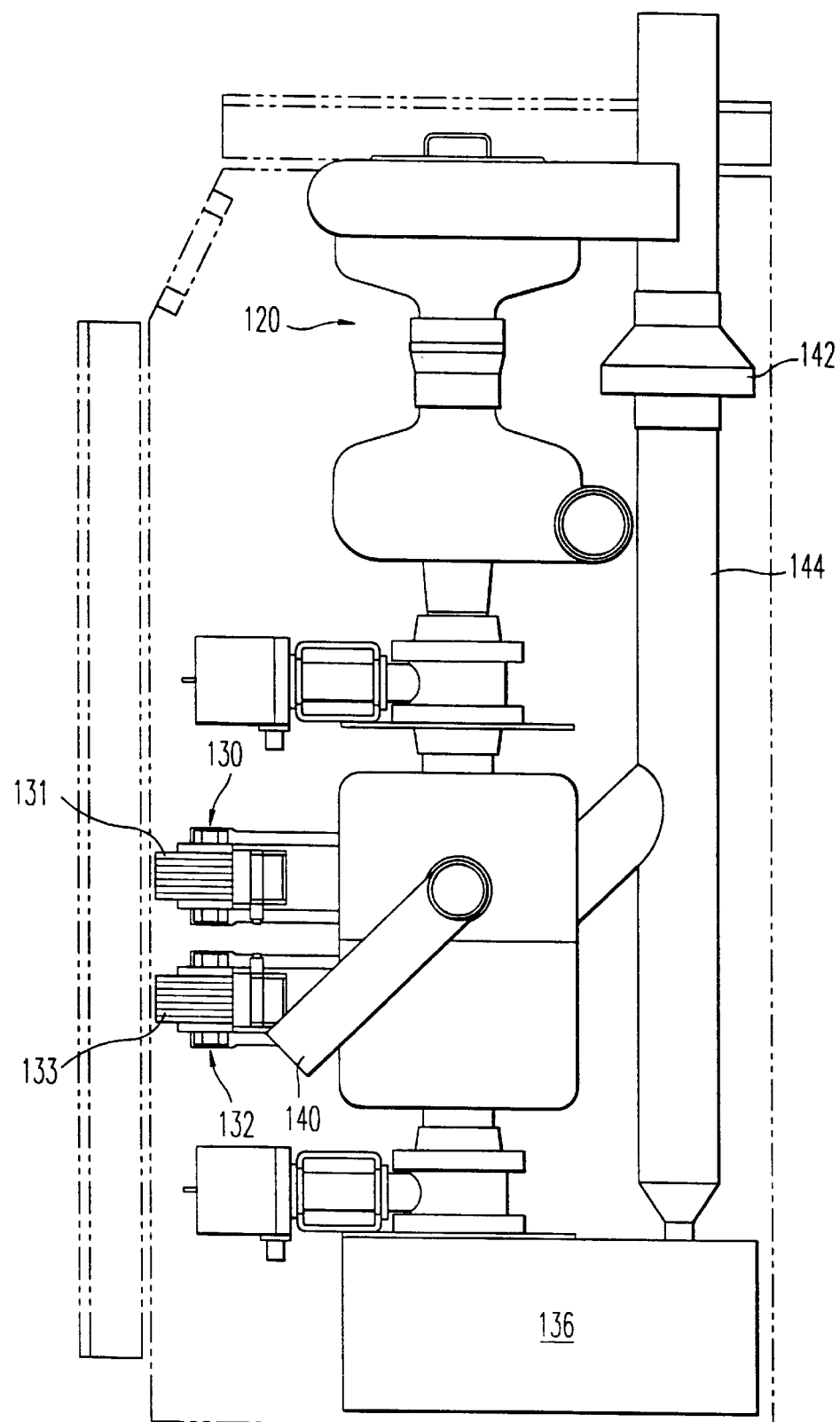
FIG. 9 is a side view of the solid treatment system of FIGS. 7 and 8.

To provide sufficient power, in the embodiment of FIGS. 7 and 8, two 650 watt magnetrons are provided as indicated generally at 130, 132, each having a respective fan 131, 133. In the arrangement shown in FIGS. 7 and 8, the magnetrons are offset approximately 90° C. from one another. This arrangement is provided primarily to allow access to both of the magnetrons (e.g., for servicing) from the same side of the treatment system, such that both of the magnetrons are accessible by removing a panel of the housing indicated generally at 200. However, it is to be understood that other configurations and orientations of the magnetrons are possible, for example, they may be disposed offset 180° from one another. As discussed further hereinafter, within the fire tube 128 a grate or substrate holds the solids, while allowing liquids to drain therethrough. In addition, if desired, a bed of particles (spheres, granules or beads) can optionally be provided above the substrate to form a granular bed to ensure that a relatively large surface area of the solid material is exposed to microwave radiation during incineration. In addition, the beaded grate or bed assembly in the fire tube allows any residual liquids to drain from the solid material. The liquid draining from the solid material will accumulate in a sump 136, with a ball valve 134 disposed between the fire tube 128 and sump 136 for metering the flow of the drained liquids into the sump. As with the ball valve 126, the valve 134 can be controlled by the central processing unit (not shown in FIGS. 7 and 8) and a motor/actuator as shown at 135.

The grating or bed inside of the fire tube 128 will include a bowl in the form of a screen or grate, or a cellular grate, with the optional particles—beads or balls (granular material) disposed above the grate such that the bowl or other substrate holds the bed, thereby allowing the bed structure to receive the solid material and act as a trickle filter to drain off small factions of the water which may be carried with the solid material. Preferably, at least some of the balls or spheres of the bed will be formed of a ceramic (e.g., alumina) material which is microwave transparent, thereby preventing excessive heating of the spheres as a result of the microwave irradiation. However, a small portion of the bed material is preferably formed of a microwave non-transparent material, for example in the center of the bed, thereby promoting heating of the solid material at the location at which the solid material is likely to be most concentrated after falling from the separator. The use of a microwave absorptive material can also be beneficial in providing a propagating burn (i.e. like a cigarette, the burn starts at a particular location and progresses until combustion/incineration is complete) rather than attempting to incinerate all of the solid material simultaneously.

After microwave radiation, the ash residue will be removed from the bed by the solid material and carriage water which falls upon the bed as the ball valve 126 is opened. However, it may additionally be preferable to include an air backflow to assist in removing any ash particles from the bed, or to provide a water or other agitating expedient to assist the ash particles in falling through the bed of balls/beads etc. into the sump 136, with the agitation also preventing the possible agglomeration of solid mass or incompletely combusted particles which can be incinerated in a subsequent irradiation sequence.

After passing through wave guides, the radiation from the magnetrons enters through openings in the fire tube/microwave chamber as shown at 137 and 139 in FIGS. 7 and 8. As shown in FIG. 8, an inlet 140 is provided to supply air for combustion within the fire tube. In addition, to improve the efficiency of the system and to improve combustion, if desired, air entering through the inlet 140 can be preheated by utilizing air which exits from the cooling fans 131, 133 utilized for cooling the magnetrons 130, 132. In addition, to reduce the number of apertures required for the fire tube 128, in lieu of the inlet 140, air can enter through the same inlet holes 137, 139 which provide access to the microwave energy. As with air entering through inlet 140, air directed through the inlets 137, 139, can also be preheated by utilizing air exiting from the magnetron cooling fans 131, 133. As a further alternative, heated air from the cooling fan(s) can be mixed with additional air which is then supplied to the fire tube, to both provide heated air, and a sufficient quantity of air to the fire tube. Air entering through inlets 137, 139 can also advantageously prevent accumulation of ash/debris at the inlet, thereby preventing the accumulation debris which could block access of the microwaves. If desired, an observation port can be provided having a transparent covering as shown at 141.

The combustion byproducts, including gaseous and particulate matter are drawn from the fire tube 128 utilizing a fan 142 disposed in an exhaust pipe or stack 144. Preferably, the fan is disposed on the downstream side of the combustion chamber or fire tube 128, such that excessive pressures do not build up inside of the fire tube. In addition, if air from the magnetron fans is to be fed into the fire tube, the fan 142 (i.e., the downstream fan) should have a greater power, such that a suction action is maintained, and pressure does not build up within the fire tube. Preferably, the fan 142 is a variable speed thermostatically controlled fan such that the speed of the fan can vary during the combustion process to enhance efficiency and complete combustion, as discussed with reference to the embodiment of FIG. 2.

To prevent particulate matter from exiting through the exhaust stack 144, a filter or scrubber is provided upstream of the fan and exhaust stack 144, for example, within a region of a connecting pipe as shown at 146 (FIG. 7). The use of an exhaust scrubber or filter is also important in reducing odors in the exhaust. Since particulate matter within the exhaust may include solid material which has not combusted completely, a third magnetron assembly can also be provided as shown at 148 (FIG. 7). The third magnetron 148 will thus subject the filter 146 to microwave irradiation, thus completing incineration of any uncombusted solid material which may exit with the exhaust gases. To allow the filter to be subjected to microwaves, the filter can be formed of a ceramic wool material, or may include plural plates or discs (e.g., a hard porous ceramic/alumina material) arranged to provide a tortuous passageway, such that particulate matter will be trapped by the ceramic discs or ceramic wool, and then subjected the microwave irradiation. In addition, the exhaust scrubber/exhaust filter can include a cellular ceramic material, a cellular material including both a ceramic and a lossy, or a cellular material with a lossy plate upstream or downstream of same (preferably upstream for burning any incompletely combusted particles). Such a cellular scrubber is structurally similar to that used in a catalytic converter (i.e., with a cellular or honeycomb cross-section), and may include a catalyst such as a noble metal e.g., cobalt, nickel). The grate which holds the solid material (or optionally the bed of granular material—balls, or spheres) can also be of a ceramic cellular structure.

Although different operating cycles may be possible, in general, the first and second magnetrons 130, 132 will be operated at the same time to commence combustion of the solid material within the fire tube 128, and the third magnetron 148 will begin heating the filter 146 at the same time, or possibly slightly before operation of the magnetrons 130, 132 for preheating. Operation of the magnetron 148 during the initial stages of the incineration/combustion process will likely be most beneficial, since the presence of particulate matter which has not been completely combusted will likely occur during the initial stages of the combustion/incineration process. An additional magnetron for the exhaust filter can also be eliminated by positioning the exhaust filter to receive microwaves from the magnetrons utilized for the fire tube, and a microwave absorptive material or lossy associated with the exhaust filter can assist in burning the incompletely combusted particles (whether or not a magnetron is specifically dedicated to the filter/scrubber). An activated carbon filter may also be provided for the exhaust gases to reduce odors, e.g. in addition to the ceramic filter, or combined with a ceramic filter.

As shown in FIG. 7, the exhaust 144 preferably includes a lower end 145 which is connected to the sump 136, such that any condensation which may accumulate in the exhaust 144 is allowed to drain to the sump 136. Typically, the sump 136 will not accumulate a great deal of moisture (since the amount of condensation from the exhaust 144 is relatively small, and the water fraction of the solid existing the separator 120 is also relatively small), and therefore liquids can be removed from the sump 136 relatively infrequently. The liquids from the sump can be removed utilizing a drainage pump or sumping device, and the liquids can be forwarded to the liquid treatment system (LTM) for further processing.

Figure 10:
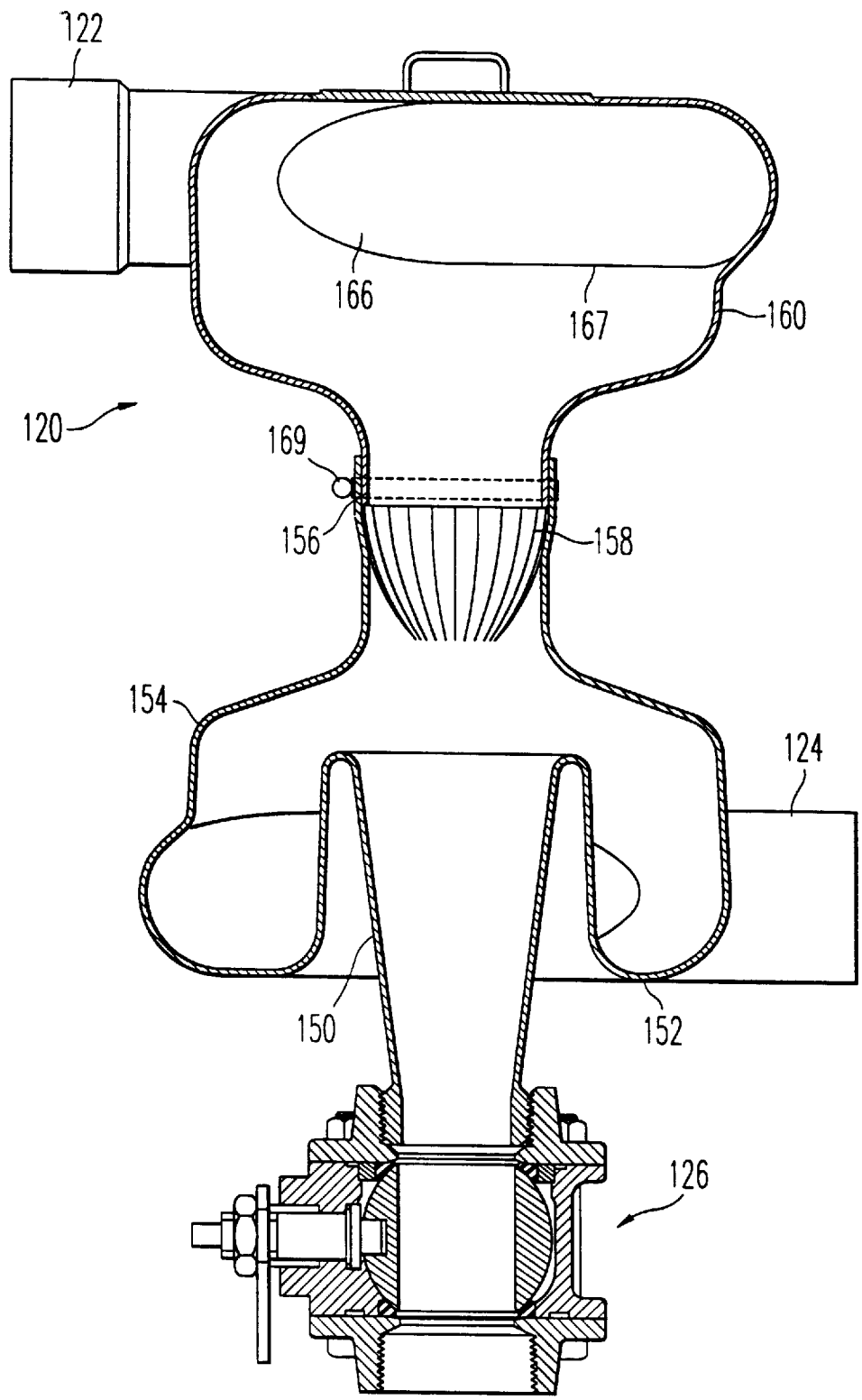
FIG. 10 is a cross-sectional view of a modified separator.

Referring now to FIG. 10, additional modifications of the separator 120 will now be discussed. As shown in FIG. 10, as with the embodiment of FIG. 5, the separator 120 has a generally hour glass shape, i.e. with upper and lower chambers separated by a reduced neck portion. The separator of FIG. 10 additionally includes a cone-like solid collecting portion 150 which collects the solid materials, which are then advanced through the ball valve 126 to the fire tube (i.e., in the waste treatment system, or to other processing equipment where the separator is utilized for other purposes). The collecting portion 150 extends above the bottommost surface 152 of the lower chamber 154, and thus, if a relatively high liquid flow rate is encountered, the liquid will not become mixed with the solid material falling through the neck 156 and wire guide 158. Thus, the separator 120 is better able to handle varying volumes, particularly varying liquid volumes which may be encountered.

The inlet structure of the upper chamber 160 and the outlet structure of the lower chamber 154 are also modified as compared with the arrangement shown in FIG. 5. In the arrangement shown in FIG. 10, the inlet and outlet structures are substantially the same, or in other words, the outlet structure of the lower chamber is the inverse image of the inlet structure of the upper chamber as shown. It is to be understood that alternate inlet and outlet structures are possible, and the inlet and outlet structures need not be the same. However, it is believed that the use of similar inlet and outlet structures provides for better dynamic balancing of the system, by balancing the inlet and outlet flows. As shown in FIG. 10, the inlet and outlet are not simply pipe openings, but rather provide more contoured merging entrance and exit passageways. In particular, as shown in FIG. 10 (and as can also be appreciated from the portions shown at 162, 164 of FIG. 7) more tapered inlet and outlet interfaces are provided (i.e., as compared with FIG. 5), with the inlet/outlet pipes and the openings between the inlet/outlet pipes and the upper and lower chambers extending partially about the separator and merging into the separator over a circumferential portion of the separator. Thus, as shown in FIG. 7, the inlet 122 merges into a decreasing radiused pipe portion 162, which merges into the upper chamber portion 160. Further, as shown in FIG. 10, the opening between the inlet pipe 122 and the upper chamber 160 extends along a portion of the inner surface of the upper chamber 160 as shown at 166. This arrangement is particularly advantageous in the upper chamber 160 in a number of respects. First, by providing a larger opening 166 which communicates with the chamber 160, a larger volume of material can be accommodated while nevertheless ensuring a desirable flow of the material entering the separator 120. The flow will initially enter the upper chamber 160 as it falls over the lower edge 167 of the inlet opening 166. For larger incoming flows and incoming flow rates, the incoming flow which does not fall over the upstream portions of the edge 167 will continue to travel along the inlet pipe, and will continue along the inlet/merging pipe portion to fall over the edge 167 at a point further downstream, or at the end of the merging portion of the inlet pipe.

Figure 11:
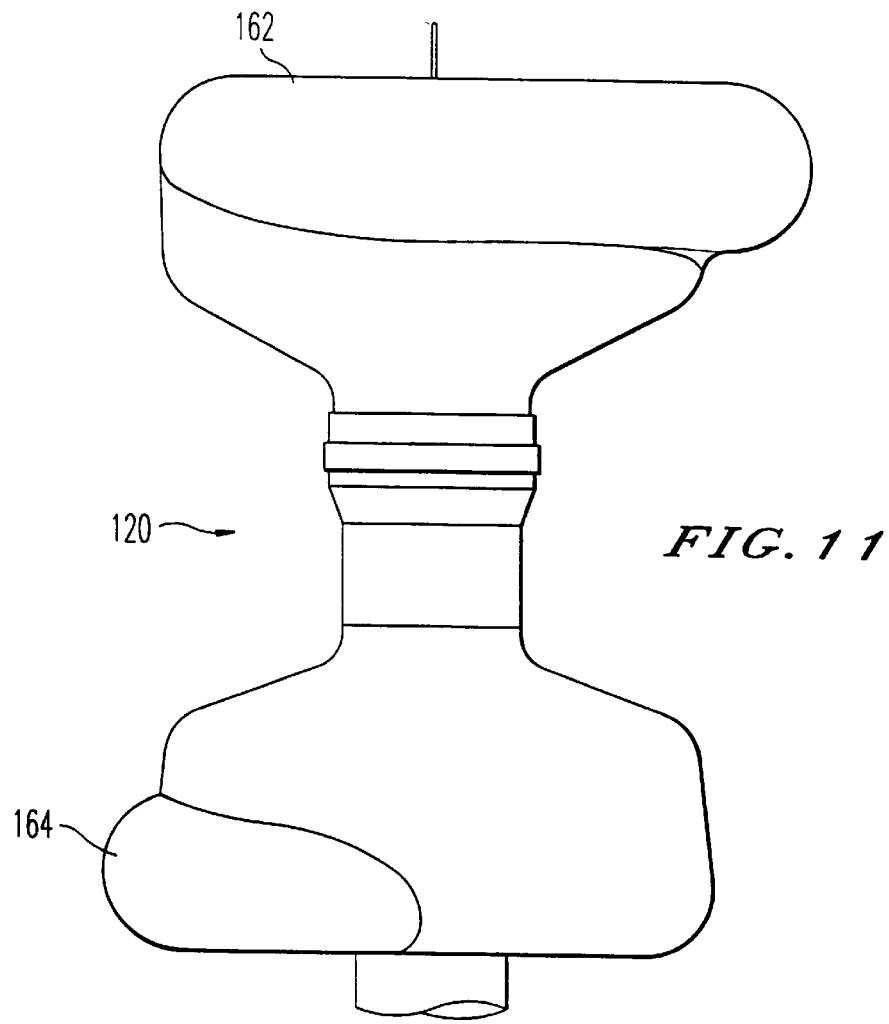
FIG. 11 is a side view of the separator of FIG. 10.

As shown in FIG. 7, the merging pipe portion 162 also provides a decreasing radius pipe which merges into the upper chamber 160, thus increasing the velocity of the material entering the separator to enhance separation without requiring a pump or other mechanical expedients in order to increase the velocity of the material entering the separator. Utilizing the separator 120, the action of the material falling vertically by gravity and traveling in a clockwise direction (i.e., clockwise when viewed from above the separator for operation north of the Equator) causes the liquid component to be held against the inner surfaces of the separator by the surface tension of the liquid, such that the liquid flows along the inner surfaces of the separator from the upper chamber 160 through the neck portion 156 and into the lower chamber 154 for exit through the outlet pipe 124. FIG. 11 is provided as a further illustration of the separator 120, depicting a side view of the separator which is not in cross-section, thereby further illustrating the merging portions 162, 164 for the inlet and outlet of the upper and lower chambers 160, 154.

Figure 12:
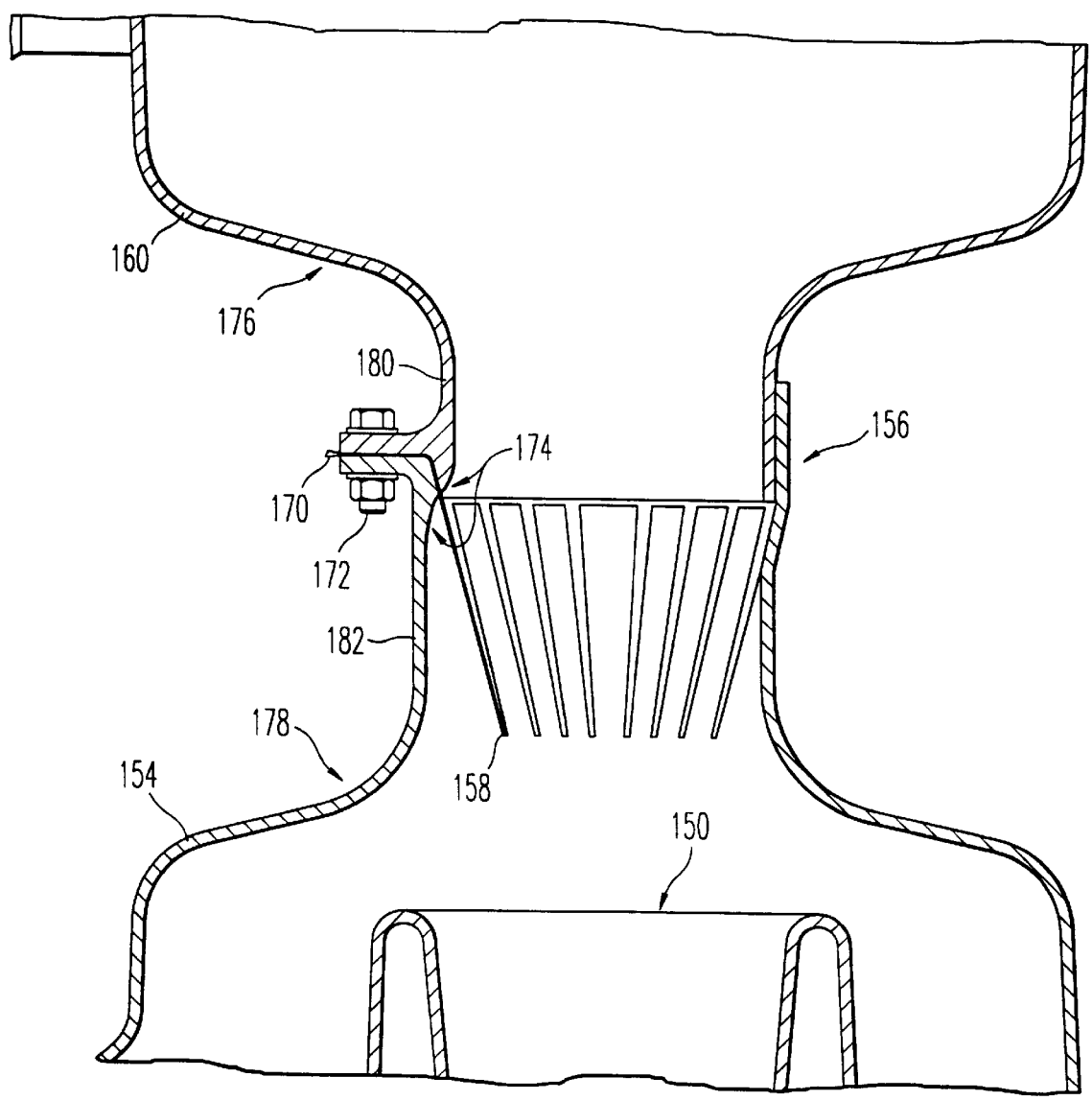
FIG. 12 is a cross-sectional view illustrating neck and wire guide arrangements of a separator of the present invention.

For comparison purposes, FIG. 12 depicts the necked portion 156, with the right hand portion of the figure depicting an assembly in which the upper and lower chambers 160, 154 and wire guide 158 held utilizing a clamping arrangement, whereas the left side of the figure depicts a modified connection arrangement between the upper and lower chambers and the wire guide 158. As shown in the left hand portion of FIG. 12, the wire guide 158 can have an upper periphery 170 or gasket portion which is clamped between the upper and lower parts of the separator 120 in the necked portion 156. As also shown in the left portion of FIG. 12, utilizing this arrangement, the upper and lower parts of the separator can be secured utilizing a bolt 172. As also shown in the left hand portion, the interface between the upper and lower parts of the chamber can also be formed such that the inner surface is continuous, even at the interface between the upper and lower parts of the separator within the neck as illustrated at 174. Thus, with this arrangement, the sheeting action and surface tension of the liquid component as it travels along the surfaces of the separator is not interrupted by the interface between the upper and lower parts of the separator, or by the wire guide 158 (or at least any interrupting is reduced as compared with the right side arrangement), such that the connection between the upper and lower parts of the separator does not interrupt the flow of the liquid, thus reducing any spraying or diverting of the liquid into the cone-like opening 150 of the lower chamber 154. Thus, with the arrangement shown in the left portion of FIG. 12, the wire guide 158 more successfully performs a scalping operation in removing and holding solid components of the material being separated, such that the wire guide acts like a rake in a river and the solid component drops from the wire guide 158 into the opening 150, while the flow of liquid along the inner surfaces of the separator is maintained.

With either the clamped or the bolted construction as shown in FIG. 12, it should be appreciated that the separator can be advantageously formed of three essential parts, including the upper part 176, the lower part 178 and the wire guide 158. Further, the upper part includes an upper chamber portion 160 and a necked portion 180 at the lower end of the upper part 176, while the lower part 178 includes the lower chamber 174 and a necked portion 182 at the upper end of the lower part 178. In addition, the wire guide is provided at the interface or in an interface region of the necked portions 180, 182 of the respective upper and lower parts 176, 178. Of course, if desired, it may also be possible to provide a different interface location between the upper and lower parts which form the separator.

Figure 13:
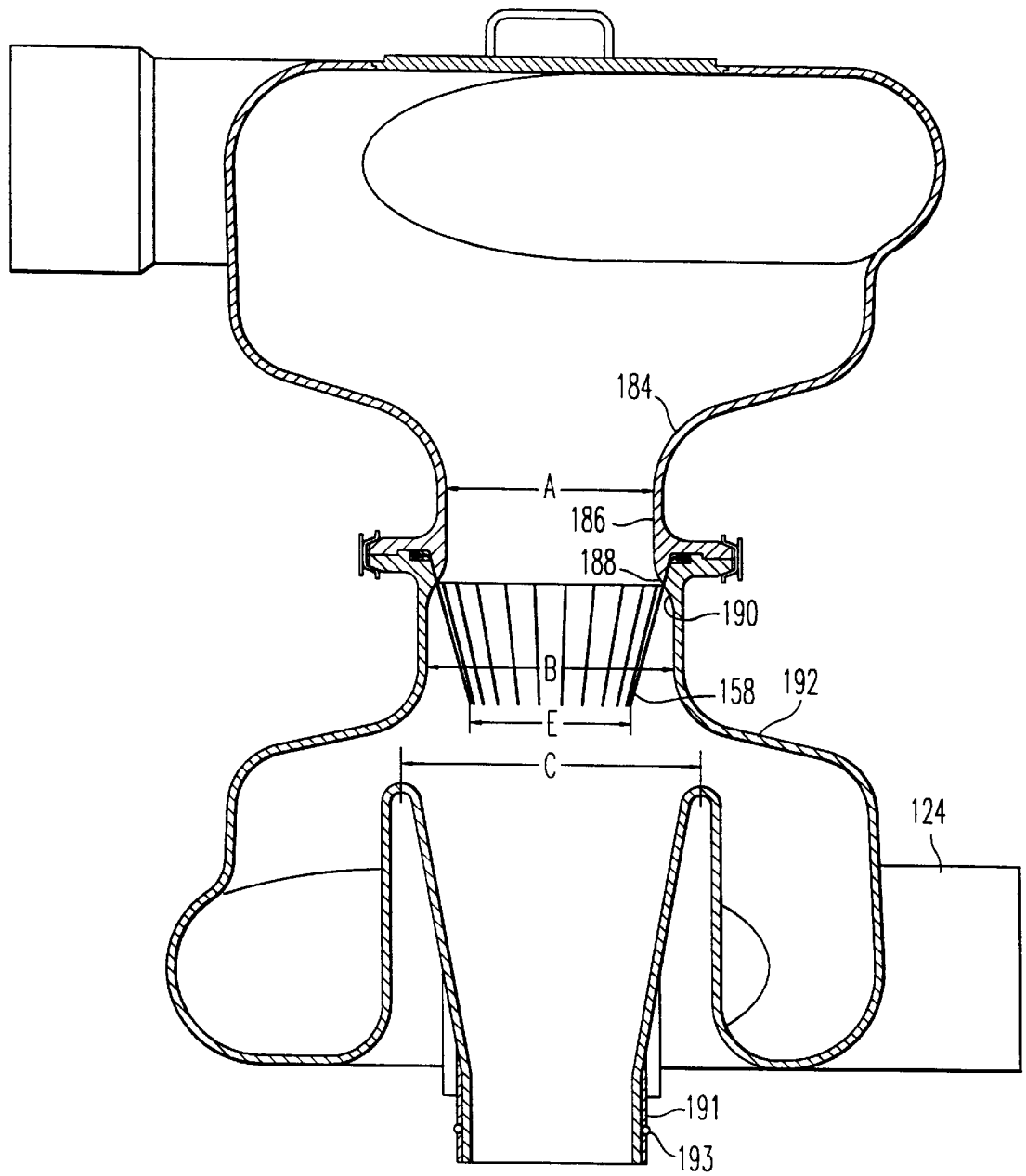
FIG. 13 is a cross-sectional view depicting additional separator modifications.
Figure 14:
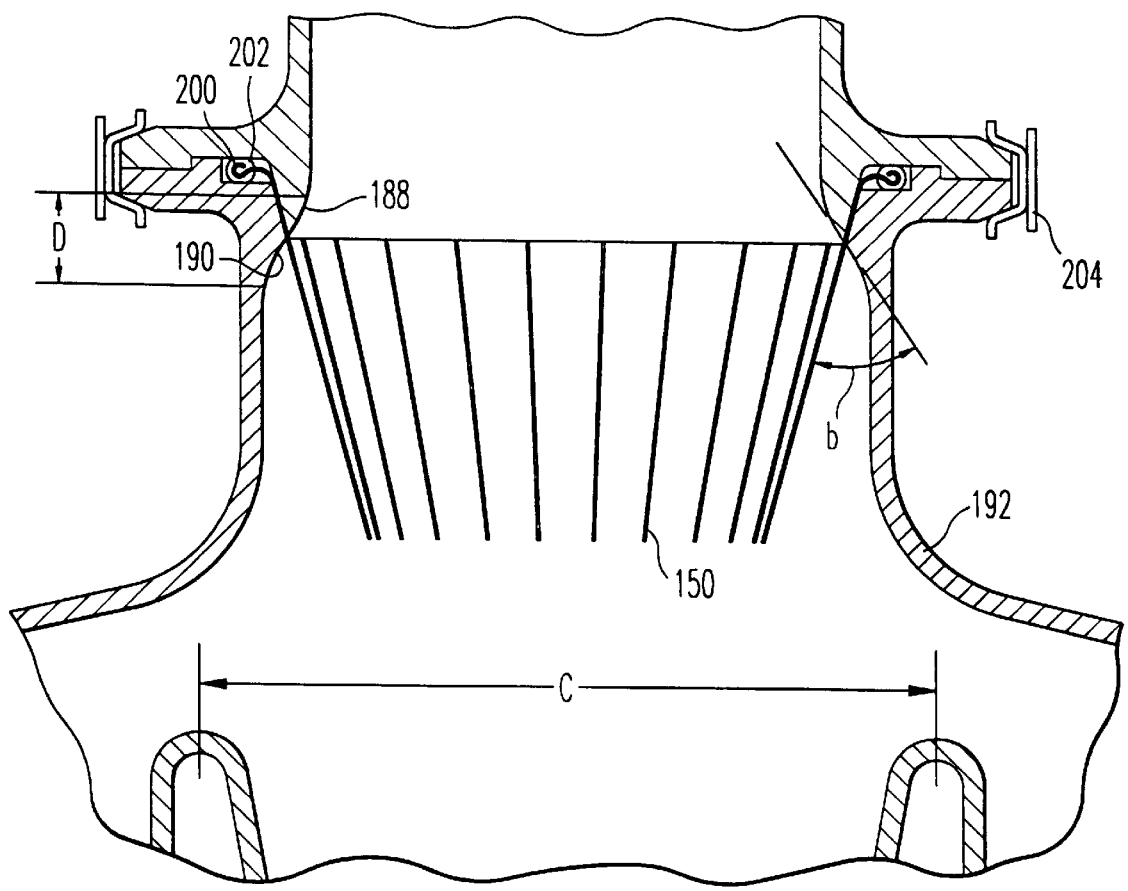
FIG. 14 is a cross-section of the neck portion of FIG. 13.

Referring now to FIGS. 13 and 14, additional aspects and modifications of the present invention will now be described. As shown in FIG. 13, the separator will preferably include a concave or inwardly sloping portion 184 followed by a constant diameter portion 186. Above the location at which the wire guide enters the necked portion of the separator, a concave outwardly sloping portion is provided as shown at 188 (i.e., the diameter increases toward the wire guide in the region above the wire guide), and below the location at which the guide wires enter the necked portion, the neck diameter continues to increase with a convex sloping portion as shown at 190. This contour provided by the curved portions 188, 190 is important in the performance of the guide wires 158 such that the guide wires 158 can mechanically separate solids from the liquid sheeting along the inner surfaces of the separator without disrupting (or minimizing disruption of) the liquid flow. In particular, with the increasing diameter portion, the liquids are drawn outwardly by the laminar flow and the surface tension effects, while the wire guides act as a rake mechanically trapping or removing any solids from the liquid. A further convex portion is provided at 192 at the transition from the necked portion to the lower chamber of the separator. Preferably, the cone 150 is larger than the largest diameter of the necked portion, thereby ensuring that the solids collected by the guide wires 158 drop into the cone 150. However, if the cone 150 has an excessively large opening diameter, carriage water can undesirably fall into the solids outlet cone, rather than being drawn to the outer portions of the lower chamber of the separator for exiting through the liquid outlet 124.

By way of example, proportional dimensions of the separator will now be described. It is to be understood that the proportional dimensions are provided as examples, and other dimensions will likely be possible. Other dimensions may actually be preferred depending upon the flow requirements and materials being separated. The dimensions are provided as relative dimensions, since different scaled sizes will likely be utilized for different applications or flow requirements. As shown in FIG. 13, for a given diameter of the top of the neck A, the diameter of the lower neck portion B can be, for example, 1.2 A. The diameter of the cone inlet C can be 1.4 A. The lower diameter of the guide wires E can be 0.77 A (FIG. 13). In addition, the vertical distance over which the diameter of the necked portion increases, as shown at D (i.e. from the location at which the neck diameter begins to increase to the location at which the neck diameter is constant again) can be 0.15 A (FIG. 14).

As also shown in FIG. 14, the guide wire will enter the neck portion at an angle b with respect to the neck portion. Preferably, this angle is approximately 30° (e.g. ±5°), and this angle has been found satisfactory in avoiding solid materials from becoming caught between the inner surface of the neck portion and the underside of the guide wire. A modified mounting of the guide wire is also shown in FIG. 14. As shown in FIG. 14, the top of the guide wire can include a hooked portion 200 encased in a neoprene or butyl gasket material 202, thus ensuring a seal in the clamped portion between the upper and lower component parts of the separator. Further, if desired, the hooked portion can include an additional wire ring, such as a metal ring, extending through the eye of the hook, for additional reinforcement and structural integrity. A swedge clamp member 204 can be provided about the joint between the upper and lower parts of the separator, thereby holding the components in place. Of course, other clamping/connector expedients are also possible.

As discussed earlier, it is desirable to provide the joint between the upper and lower parts of the separator at the neck portion such that the upper and lower parts of the separator can be rotated relative to one another, thereby accommodating for different installation constraints, i.e., such that the inlet and outlet positions can be adjusted to properly connect the inlet and outlet to the waste source and to the drain (or to the location of the liquid treatment module). In addition, adjustment of the position of the lower chamber with respect to the upper chamber (thus adjusting the position of the inlet pipe with respect to the outlet pipe) can be helpful in "tuning" the separator such that the inlet and outlet flows are more dynamically balanced. Thus, the respective positions may be adjusted depending upon the flow rates being encountered, or the materials being separated.

Although the guide wire member is shown as a plurality of substantially constant diameter, inwardly sloping wires 158, it has been recognized that a number of variations are also possible. For example, the guide wires can have an inwardly curved profile rather than a straight inclined inward profile as shown. The guide wires also need not be uniform about the circumference of the guide wire ring, but may have varying lengths or varying spaces with respect to one another. In addition, it has been recognized that at least in some applications it may be desirable to have a stiffer or less flexible construction in the top portions of the guide wires, with a more flexible or more elastic characteristic toward the bottom of the guide wires. This type of arrangement will allow the guide wires to withstand forces which may be encountered as the water passes through the guide wires and along the inner surfaces of the separator, while the upper portions of the guide wires perform the rake function in removing solids from the liquid. Once the guide wires remove the solids from the liquid, the solids are conveyed along the guide wires, and then drop into the cone 150 of the solid outlet. A more flexible lower portion can assist in allowing solids to drop into the solids outlet cone. The varying flexibility or varying strength of the upper portion of the guide wire as compared with the lower portion of the guide wire can be provided by a tapered guide wire having a thicker top portion, or by varying the temper between the upper and lower portions of the guide wire, for example if the guide wires are formed of stainless or another metal. Further, a non-stick coating such as a teflon coating can be provided on the guide wires such that the solids removed by the guide wires slide or are conveyed downwardly toward the solids outlet cone.

As shown at the bottom of FIG. 13, the lower portion of the separator can also include a thickened or reinforced socket portion 191 having an O-ring 193 such that the outlet is properly sealed when connected to the ball valve assembly disposed between the separator and the fire tube.

Figure 15:
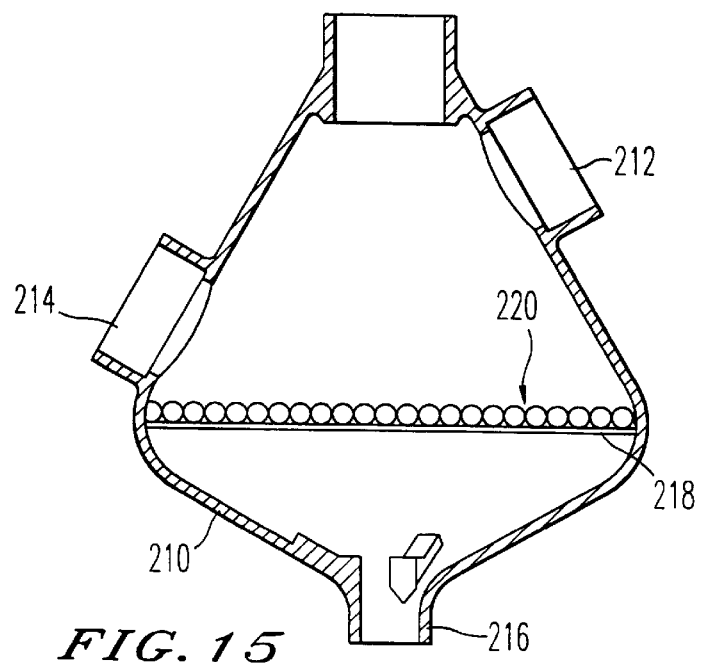
FIG. 15 is a cross-section of a fire tube or microwave chamber of the present invention.

FIG. 15 shows a cross-sectional view of an alternative embodiment of the fire tube. As discussed earlier, the fire tube can have a cylindrical shape (i.e. as indicated at 128 in FIG. 7), however, it is believed that the arrangement shown in FIG. 15 may provide a better air flow, although this arrangement will likely be more expensive. The fire tube 210 shown in FIG. 15 includes an air inlet 212 with an air outlet as shown at 214, such that an "S" flow pattern is provided through the microwave transparent fire tube 210. As with the cylindrical fire tube, an outlet is provided at the bottom part of the fire tube as shown at 216, such that any liquids draining from the fire tube pass to a sump. As also shown in FIG. 15, within the fire tube, a substrate, dish or perforated screen portion 218 (grate) is provided, above which can be supported the optional ceramic or alumina balls/granules 220, such that the solids fall upon the balls 220, and any residual liquid in the solid drains and exits through the exit 216 to the sump, while the solid remaining at 220 is subjected to microwave incineration as discussed earlier. As discussed earlier, the balls granular/loose material 220 assist in ensuring an adequate surface area of the solid waste is exposed to microwaves, and in preventing the solid from clumping in a mass. As also discussed earlier, a portion of the beads can be formed of a microwave absorptive material, and a backflow/backwash or agitating device can optionally be provided for the beads 220. Alternately, a cellular (e.g. honeycomb) grate can be utilized to hold the solids while allowing drainage. The grate can be formed of a ceramic, and can be utilized with a microwave absorptive material as part of the cellular structure, as a coating on the cellular structure, or with the microwave absorbent material ("lossy") provided upstream or downstream of the cellular structure as discussed further hereinafter. As shown in FIG. 15, the fire tube has conical upper and lower portions. As with the cylindrical (FIG. 7) or other shaped fire tube, the fire tube is preferably disposed below the separator, such that the solids drop from the separator into the fire tube.

Figure 16A:
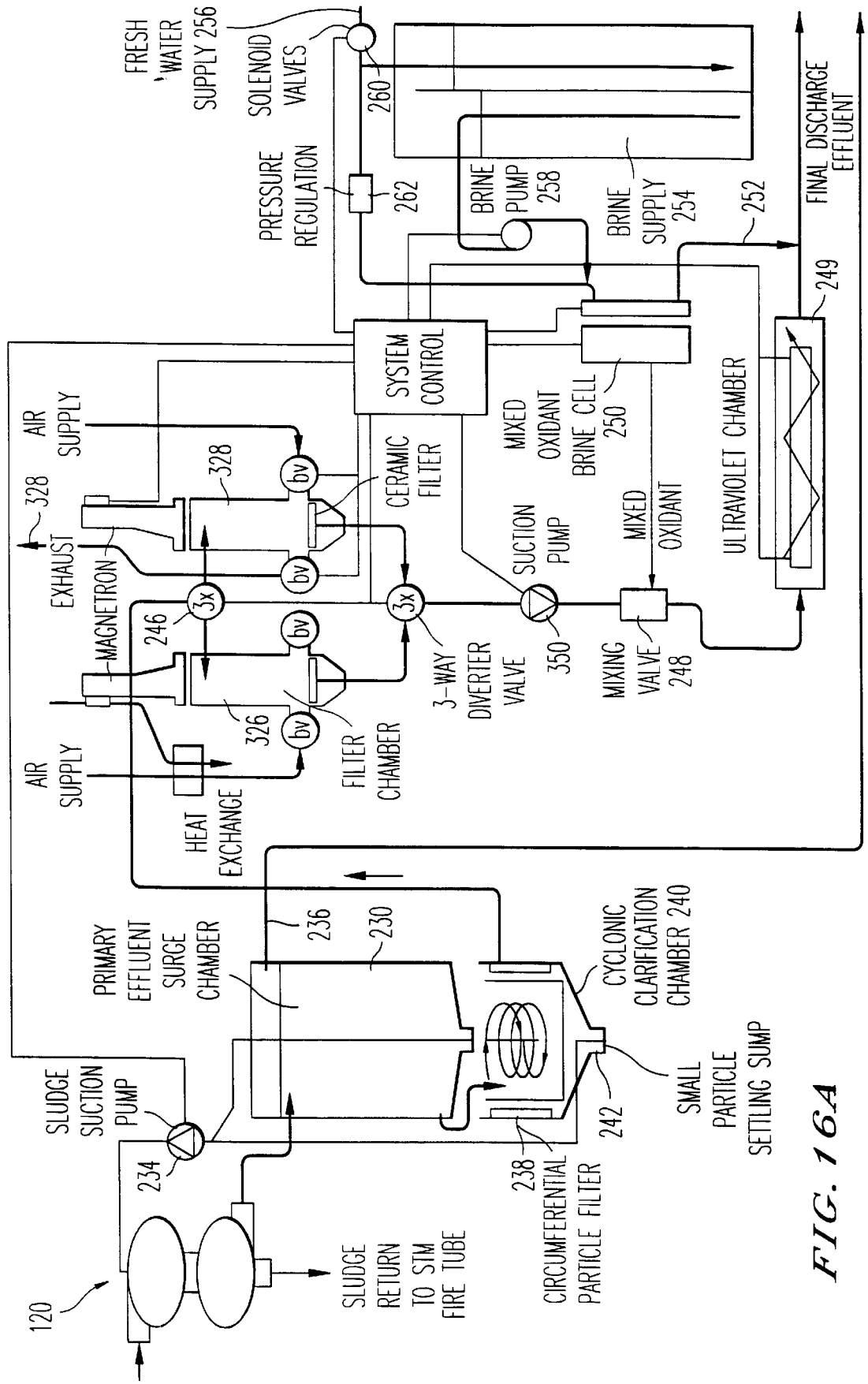
FIGS. 16A and 16B are schematic views of a modified liquid treatment systems of the present invention.

Referring now to FIG. 16A, an alternate liquid treatment system is shown. The system of FIG. 16 is advantageous over that of FIG. 1 in that additional removal of solids, or additional clarification, is provided before the liquid is subjected to the filtration, treatment with a liquid which includes at least an oxidant or mixed oxidants and ultraviolet treatment (or with microwave radiation as an alternative to UV). As a result, the subsequent treatments are more effective/efficient, and/or require less aggressive treatment. As shown in FIG. 16A, the liquid exiting the separator 120 enters a surge tank 230 which acts as a flow equalizer and temporary storage location for the liquid exiting the separator. Solid particles which settle in the surge tank 230 are drained as shown at 232, and are pumped back to the separator via pump 234, such that the sludge or scum (from the surge tank) drops through the separator and into the fire tube of the solid treatment module. It is also possible to feed the sludge or scum from the surge tank (and also from the cyclonic clarification chamber discussed hereinafter) directly to the fire tube without passing through the separator, however such an arrangement would be more complicated in requiring additional access porting and valving to the fire tube while ensuring that the fire tube is maintained in a sealed condition (i.e., sealed from the separator and the sludge feed from the surge tank 230 and the clarification chamber) during combustion in the fire tube.

An overflow discharge for the surge tank 230 is provided as shown at 236 in the event of a power failure such that over an extended period liquids are not removed from the surge tank 230 (and/or if an excessively large inflow is encountered). The overflow provided at 236 will likely rarely be utilized. However, since the TOC (total organic carbon) and BOD (biochemical oxygen demand) is typically below 30–40 parts per million, the overflow 236 of the surge tank can be discharged as a final effluent.

The liquid in the surge tank 230 (i.e., assuming no overflow) passes through a filter 238, and then to a clarification tank such as a cyclonic clarification chamber 240. Two examples of cyclonic clarification chamber arrangements will be discussed hereinafter. Basically, the flow from the surge tank 230 is introduced tangentially into the cyclonic clarification chamber to produce a spiral flow, which causes particles in the clarification chamber to settle toward the bottom of the clarification chamber, and the settled particles are then pumped from a draining area or small particle settling sump 242, and are fed back to the fire tube via the separator. In addition, in the cyclonic clarification chamber, any floating materials are also removed, and the remainder passes through a filter material 244 and to a three way valve 246 such that the flow is alternately directed to one of the filter chambers or filter tubes 326, 328.

Each of the filter chambers 326, 328 include a ceramic filter. Periodically, when a given one of the filter chambers is not in use (i.e., when the flow is being directed to the other filter chamber) the ceramic filter is subjected to microwave energy to incinerate any debris which accumulates in the ceramic filter. A suction pump 350 draws the liquid through the filter chambers, and a mixing valve is provided at 248 to mix the liquid exiting the filter chambers with a liquid which includes at least one oxidant or mixed oxidants. The oxidant(s) or liquid containing oxidant(s) is generated at an oxidant cell assembly 250. A conventional mixed oxidant brine cell arrangement can be utilized. Such a mixed oxidant brine cell has been utilized in much larger applications, but has not been utilized in a smaller scale waste treatment system, such as one suitable for domestic use, until the present invention. The mixed oxidant brine cell 250 receives a 3% brine solution, and includes an anode and a cathode assembly which is typically formed of titanium plates (the mixed oxidant cell is also known as a miox cell). A low pH solution is generated at the anode, while a low pH solution is generated at the cathode. Oxidants are liberated by the mixed oxidant cell, and the low pH solution exits the mixed oxidant cell and is mixed with the liquid from the filter chambers by the mixing valve 248. It is to be understood that other means for providing an oxidant liquid (or a liquid including at least one oxidant) are also possible, for example by providing an ozone generator and dissolving the ozone in water. The mixing with the liquid which includes at least one oxidant or mixed oxidants reduces organic contaminants and clarifies the liquid exiting the ceramic filter, and thereafter, the mixture enters an ultraviolet chamber. The clarification with a liquid containing an oxidant or mixed oxidants decreases the opacity of the liquid, thus increasing the effectiveness of the ultraviolet (or microwave) treatment, and therefore the ultraviolet/microwave treatment is downstream (e.g. as shown at 249) from the treatment with the liquid including an oxidant or mixed oxidants. The treatment with ultraviolet or microwave radiation at 249 enhances the ability of the oxidant(s) to break the bonds of the organic materials, thus increasing the effectiveness of the oxidant(s). In the arrangement shown, the ultraviolet or microwave radiation is provided while the liquid is flowing (e.g. through a transparent pipe portion), however, a batch-wise chamber arrangement may also be possible. After the ultraviolet or microwave treatment at 249, the high pH solution from the mixed oxidant cell's cathode is combined with the liquid exiting the ultraviolet chamber to provide a more neutralized effluent solution.

The mixed oxidant cell is shown in FIG. 16A as a brine based treatment system. Such an arrangement is advantageous in that a brine supply can be provided in a relatively small area (for example, a brine supply of two six inch diameter cylinders three feet high will likely be sufficient for one year of household use). The brine supply is shown at 254, and includes granular sodium chloride or brine, with water added from the fresh water supply as shown at 256 such that the solution exits the brine supply 254 via the brine pump 258 as a saturated brine solution. The fresh water supply is also connected via solenoid valve 260 and pressure regulator 262 to the inlet of the mixed oxidant cell, such that the fresh water is mixed with the saturated brine solution to provide, for example, a 3% brine solution entering the mixed oxidant cell.

As should be apparent from the foregoing, the liquid or waste water from the separator is received by the surge tank 230, and is subjected to a secondary clarification utilizing the surge tank and the clarification chamber 240. By way of example, the system can be operated such that the surge tank empties 98% of its volume into the clarification tank or settling vessel 240 on a daily basis, with any particles or scum settling in the surge tank, as well as any particles such as hair and lint retained by the filter of the surge tank removed from the sump of the surge tank at the end of a daily cycle. The liquid is then filtered in the filter tubes 326, 328 in order to remove particles having an effective size of, for example, 50 microns or larger. The liquid exiting the filter assemblies 326, 328 is low in total suspended solids, but still contains a larger than optimal dissolved organic content (measured as TOC or $BOD_5$) and potentially pathogenic microorganisms. The mixing of the liquid exiting the filters 326, 328 with an oxidant liquid (the liquid including an oxidant or mixed oxidants) and then subjecting the liquid to an ultraviolet treatment (in ultraviolet cell 249) provides an oxidation/disinfection process by dissolving organic compounds and disinfection using ultraviolet enhanced chemical oxidation. The electrolytic cell, mixed oxidant cell or other means for providing a liquid which includes at least an oxidant, generates the desired oxidant solution, and the ultraviolet or microwave chamber generates additional ozone and hydroxyl free radicals. With the brine based cell arrangement discussed earlier, the constituents of the mixed oxidant can include ozone, hydrogen peroxide, hypochlorite, chlorine dioxide and chlorine. However, it is to be understood that other oxidants are possible, and it is believed that oxidants other than chlorine will be desired in the future, in view of the recognition of chlorine as a carcinogen.

By way of example, the following reactions take place in the oxidation and disinfection process as shown in FIG. 16A. First, a chemical oxidation will occur as the oxidant liquid is mixed with the liquid exiting the filter assemblies 326, 328, in which the organic-N (e.g. protein) oxidation reaction mediated by the oxidant liquid can be described as:

$$C_8H_{12}O_3N_2 + 8O_2 \rightarrow 8CO_2 + 3H_2O + 2NH_3$$

This oxidation reaction produces carbon dioxide ($CO_2$) and water ($H_2O$) as by-products, as well as ammonia ($NH_3$) or nitrate ($NO_3$). The ultraviolet irradiation step produces hydroxyl ($OH^-$) free radicals in the mixed oxidant which enhance the oxidation process. In addition, a chemical denitrification occurs as a result of the mixing with oxidants and ultraviolet disinfection, which involves the hydrolyses of urea, another organic nitrogen compound as follows:

$$CH_4N_2O + 2H_2O \rightarrow (NH_4)_2CO_2$$

In addition, a reaction occurs between one component of the mixed oxidant, hypochlorite ($OCl^-$) with ammonium ($NH_4^+$) as follows:

$$2NH_4^+ + 3OCl^- \rightarrow N_2\uparrow + 3CL^- + 3H_2O + 2H+$$

The reaction proceeds rapidly in the presence of excess $OCl^-$ at a pH>9.0 to sequentially replace hydrogen with chlorine, forming mono-, di- and tri-chloramine, and ultimately free chlorine and nitrogen gas. This reaction is known as breakpoint chlorination. Other reactions are possible, for example:

$$2NH_4^+ + ClO_2 \rightarrow N_2\uparrow + CL^- + 2H_2O \text{ (not electron balanced)}$$

$$2NH_4^+ + O_3 \rightarrow N_2\uparrow + 2H^+ + 3H_2O$$

Both of the above reactions shown proceed at pH>9.0. Of course, the foregoing reactions are provided as examples, and it is to be understood that other oxidant/disinfection reactions are possible. The pH adjustment can be accomplished by the addition of a catholyte (e.g. liquid from the cathode of the electrolytic cell) or other basic liquid upstream of the location at which the liquid including an oxidant is added. Thus, where denitrification is desired, a basic liquid is added upstream of the location at which the liquid including an oxidant is added. Otherwise, the basic (e.g. from the cathode of the electrolytic cell) liquid can be added after the final UV/microwave radiation to provide a more neutral effluent.

Figure 16B:
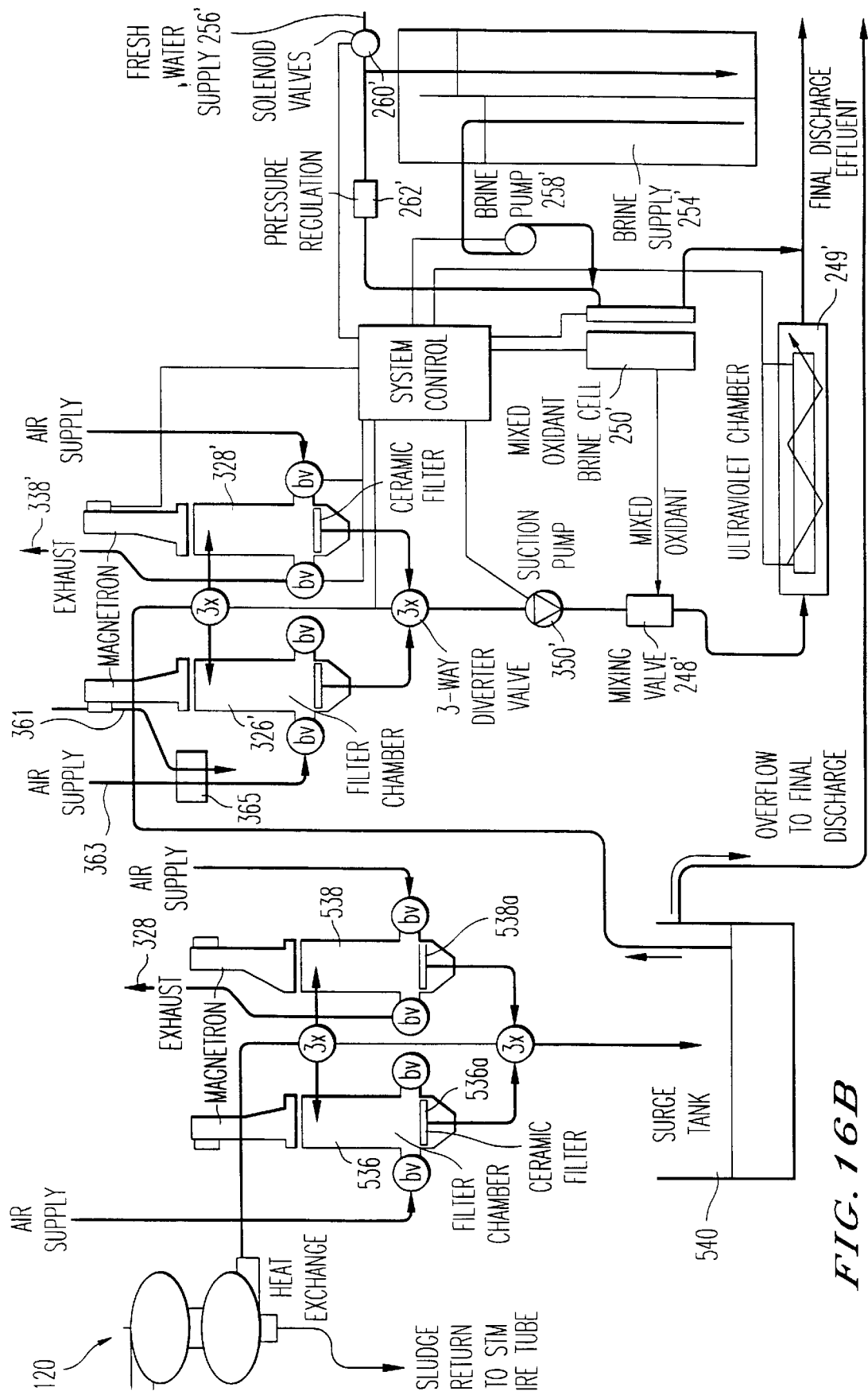

FIG. 16B shows an alternate arrangement of that shown in FIG. 16A. As shown in FIG. 16B, the initial clarification can be provided by ceramic roughing filters 536, 538 which are similar to the filters 326, 338 described in FIG. 16A, however the respective ceramic filters 536A, 538A have a larger pore size, such that the initial microwavable filter assemblies act as a roughing filter, while the downstream filter assemblies 326', 328' filter the finer particulate matter (e.g., with a ceramic filter having a pore size of 50 microns). A surge tank 540 is disposed downstream of the filter assemblies 536, 538 to provide a flow metering, and/or for additional clarification. In particular, with the flow provided in the surge tank, additional particle settling can occur, and settled particles can periodically be removed from the bottom of the surge tank by appropriate pumping means. The flow is then fed from the surge tank 540 to the filter assemblies 326', 328', with the remainder of the system as discussed with respect to FIG. 16A.

Thus, with the arrangements of FIGS. 16A and 16B, a first treatment step involves clarification or removal of larger particles and floatables (utilizing either the clarification chamber of FIG. 16A or the roughing filters of FIG. 16B). The second step includes fine particle filtration utilizing the filter assemblies 326, 328, 326' 328'. Finally, an oxidation/disinfection treatment is provided by mixing the liquid (exiting the filters) with a liquid which includes an oxidant or mixed oxidants, and further subjecting the liquid to ultraviolet or microwave radiation. As should be apparent from the foregoing descriptions of FIGS. 1, 16A and 16B, solids are removed, by one or more components which provide a solid removal means (or means for removing solids), to produce a stream of clarified liquid. The stream of clarified liquid is fed to a microwave filter assembly, which further removes suspended particles to produce a filtered stream, and the suspended particles are incinerated by the microwave filter assembly. The solid removal means can include one or more components as described herein, including one or more of a separator, a settling tank or clarification chamber, a roughing filter (e.g., as shown at 536 in FIG. 16B), or other equivalent structures which will remove solids to provide a clarified liquid stream, and the clarified liquid stream is then further clarified by the microwave filter assembly, to produce a filtered liquid which can then be further treated.

Figure 17:
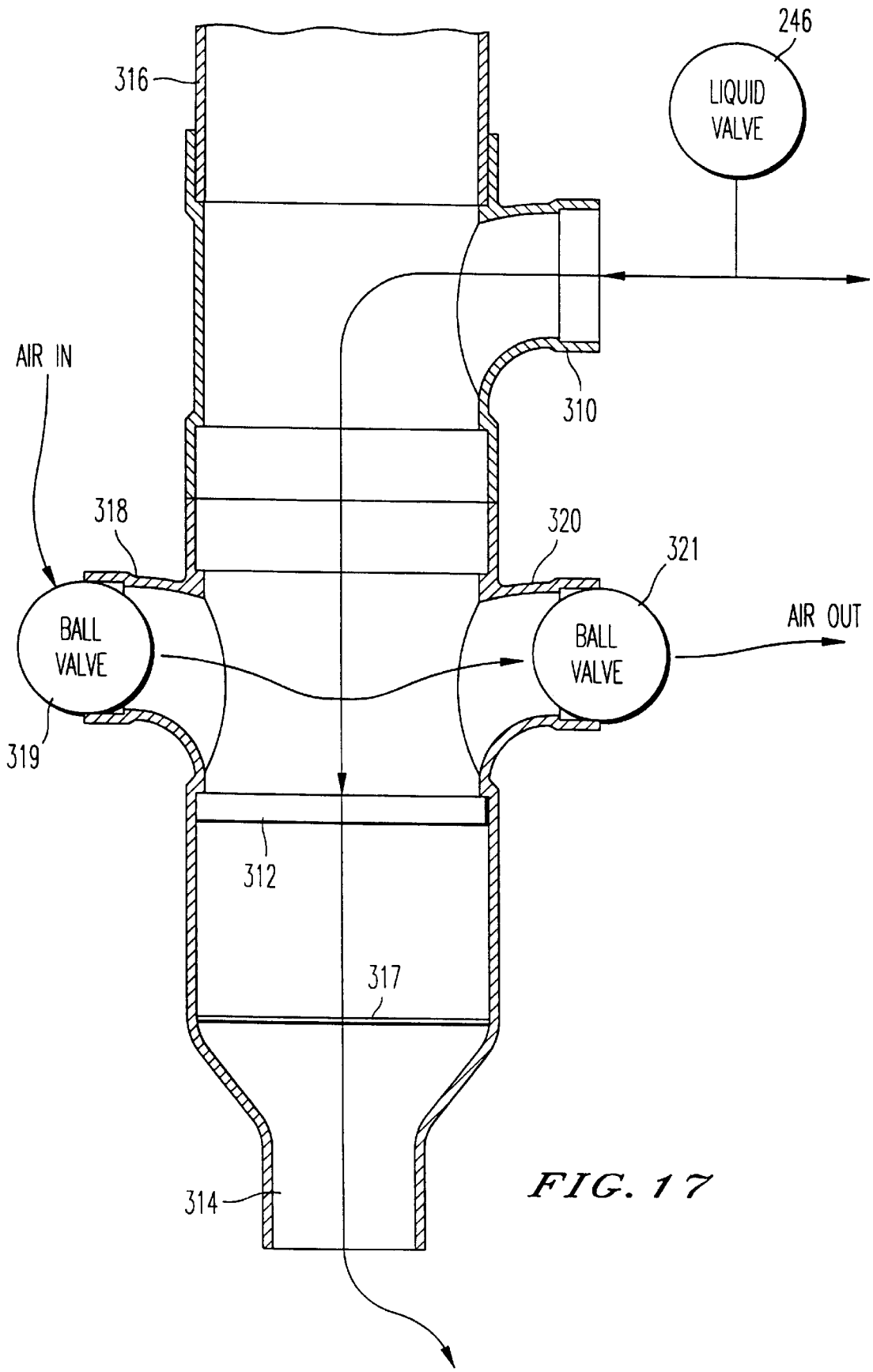
FIG. 17 is a cross-section of a filter assembly or microwavable filter arrangement for use in the liquid treatment system.

FIG. 17 depicts a cross-sectional view of one of the liquid filter assemblies shown at 326, 328 in FIG. 16. As shown in FIG. 17, the liquid will enter through inlet 310, with a diverter or three way liquid valve 246 disposed upstream of the inlet 310 such that the flow is only directed to one of the assemblies at a time as discussed earlier. Disposed inside of the liquid filter assembly, a disc filter 312 (or other filter element arrangement as discussed hereinafter) is provided which can be formed, for example, of an alumina material which is porous to allow liquids to pass therethrough, but retaining any particulate solids (e.g., >50 microns) which may remain in the liquid. A pump (not shown) is disposed downstream of a liquid outlet 314 to draw the liquid through the filter 312 (see, e.g., pump 350 in FIG. 16A). A microwave attachment is provided as shown at 316, such that solids trapped by the filter 312 are periodically incinerated. An air inlet 318 and air outlet 320 are also provided for supplying air for the incineration process, with the air in and air out regulated utilizing a valve arrangement such as a ball valves 319, 321. The air outlet 320 can be connected to the same variable speed fan assembly as the fire tube of the solid treatment module, or a separate fan outlet assembly can be provided. Element 317 is a metallic screen or shield which defines an end of the microwave chamber within the microwave filter assembly. More particularly, as in a conventional microwave oven, the screen 317 prevents microwaves from escaping therepast, and acts as a microwave reflector, thus delimiting the microwave chamber or defining the geometry of the microwave chamber. The microwave chamber can be a single mode or multimode arrangement, and the microwaves will be focused at a location of the load (i.e., the material trapped upon the filter), or at a location of a lossy (a microwave absorbent material which can be utilized in combination with a ceramic or microwave transparent material as discussed further hereinafter). By way of example, for a three inch diameter of the ceramic filter 312 and screen or perforated plate 317, a spacing between the filter and screen can be approximately 12 inches.

Figure 18:
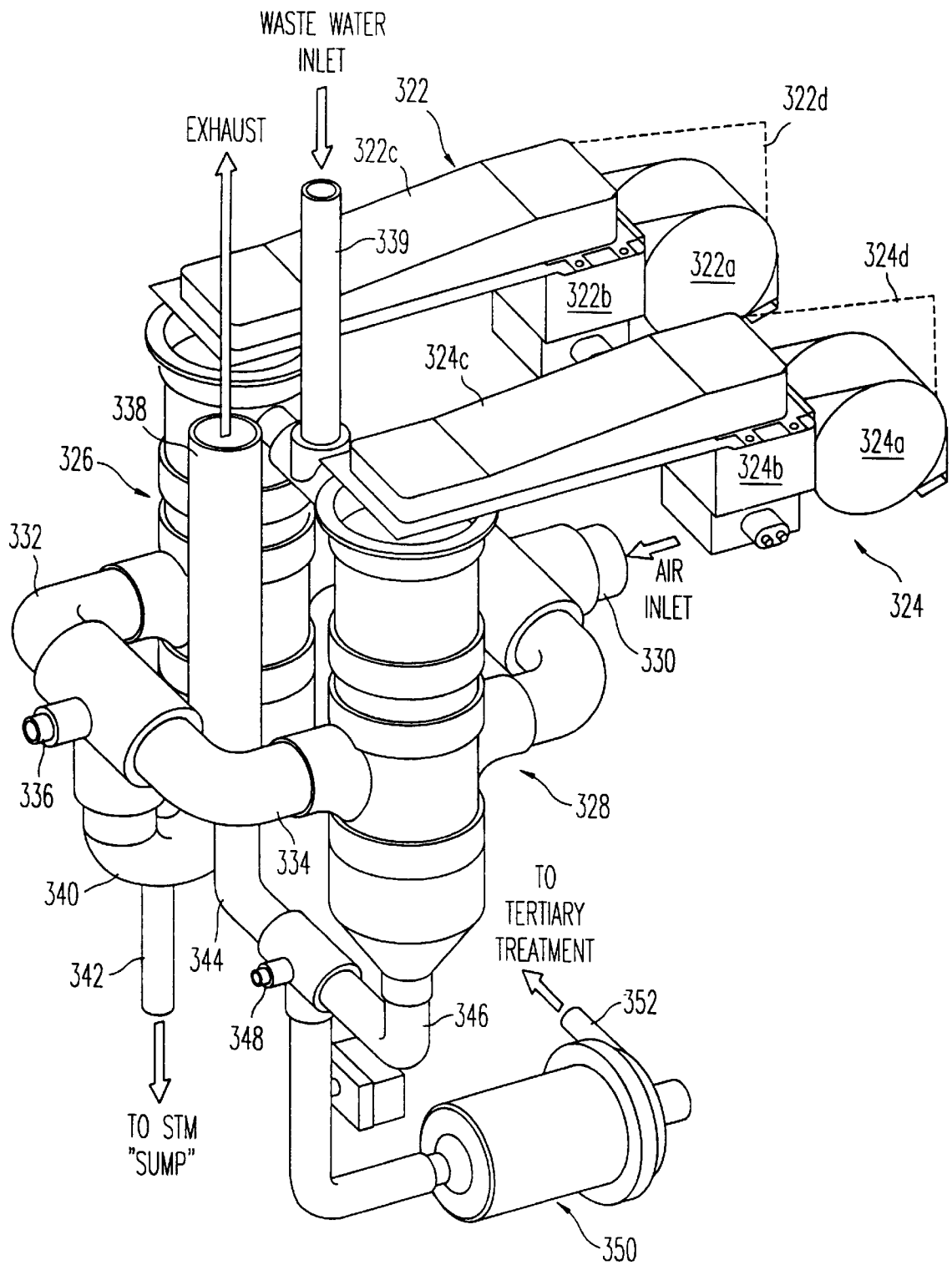
FIG. 18 is a perspective view of a pair of filter assemblies of FIG. 17.

Referring to FIG. 18, a more complete view of the various components of the microwavable liquid filter/incineration assembly of the present invention is shown. As discussed earlier, two filter/incineration assemblies 326, 328 are provided such that one is always available for filtering liquids, even while the other may be undergoing a microwave incineration process (or cooling thereafter). As shown in FIG. 18, a microwave assembly 322, 324 can be provided for each of the filter/incineration assemblies 326, 328. However, a single microwave assembly which can alternately direct microwave energy into each of the respective filter/incineration assemblies 326, 328 could also be utilized (as schematically represented in FIG. 16A). As shown in FIG. 18, each microwave assembly includes a fan 322*a*, 324*a* for cooling a magnetron 322*b*, 324*b*. In addition, a wave guide 322*c*, 324*c* is provided for guiding the microwaves from the magnetron into the filter/incineration tubes 326, 328. As discussed earlier with reference to the fire tube associated with the solid treatment module, the wave guides 322*c*, 324*c* can direct the microwaves through a transparent cover, the transparent cover here provided at the top of each the tubes 326, 328. However, it is also possible to pass air from the cooling fans 322*a*, 324*a* through the wave guides 322*c*, 324*c* with additional flow passages for the fan as schematically represented at 322*d*, 324*d*, with this air entering the filter assemblies 326, 328 at the location where the microwaves enter. This arrangement can be advantageous in a number of respects. First, if a transparent opening is utilized in the incinerator arrangement, over a period of time it may become soiled with ash or carbon particles, thus decreasing the efficiency of the microwaves. By providing a duct such that air from the fan is passing into the incitation/filter tubes, a positive pressure is maintained at the top of the incineration/filter tubes such that ash or carbon particles do not flow back toward the magnetron or wave guide, thus preventing blockage of the microwaves. Further, by utilizing the cooling fan of the microwave assembly for providing the positive pressure, the air is preheated, thereby increasing the efficiency of the combustion process.

As shown in FIGS. 16A and B, preheating of the air entering the tubes during microwave incineration can also be provided by mixing air from the cooling fan(s) (361) with additional inlet air (363) as shown at 365 of FIGS. 16A and B. This mixing arrangement is advantageous where the air quantity from the cooling fans is less than optimal.

As shown at 330 (FIG. 18), an air inlet is provided (i.e., if the air does not enter through the wave guides, such as where fresh inlet air is provided or where the inlet air is mixed with air from the cooling fans as shown in FIGS. 16A and B) which services both of the filter/incineration assemblies 326, 328, with a valve (not shown) disposed at the inlet joint, such that air is supplied to only one of the assemblies at a time (since only one assembly is subjected to microwave energy at a time, while the other is filtering liquids). Similarly, an air outlet is provided for each of the assemblies as shown at 332, 334, with a valve 336 provided such that only one outlet is open at a time, i.e., during incineration in that assembly. The exhaust then passes to an exhaust outlet 338, which, as discussed earlier may pass to either the same variable speed fan as utilized in the solid treatment module, or a separate fan assembly. Preferably, a trap portion 340 is provided in the exhaust, with a drain 342 extending from the trap, thereby draining any condensate which may accumulate in the exhaust system. The liquid draining from the drain 342 can be sent to the solid treatment module sump, or, if desired, to the inlet of the separator. Each of the filter/incineration assemblies 326, 328 also includes a liquid outlet 344, 346, which are connected by way of a three way valve 348 (since only one assembly is draining liquids at a time) to a pump 350 which draws the liquids through the assemblies. The liquids exit the pump 350 as shown at 352 to the tertiary treatment (i.e., treatment with liquid which includes oxidant(s) and ultraviolet or microwave radiation) as discussed earlier. By way of example, and not to be construed as limiting, for household use, the air inlet 330 and exhaust outlet 338 can have two inch diameters, and the inlet 339 can have a one inch diameter.

Referring now to FIGS. 19A–F, alternate liquid filter/incineration assemblies are shown. The arrangements of FIGS. 19A and B are alternates to the filter assemblies discussed earlier with respect to liquid treatment, while FIGS. 19C–19F provide configurations which can be utilized in either the liquid treatment microwave filter assemblies, or in the microwave fire-tube of the solid treatment system. As compared with the assembly of FIGS. 17 and 18, the arrangement of FIG. 19A provides a larger horizontal filter area upon which solids can be removed from the liquid and incinerated. Further, while the arrangement of FIGS. 17 and 18 depict only a overfire arrangement (i.e., in the incineration air is directed only over the filter), in the FIG. 19A arrangement, a pair of air inlets 360, 362 are provided such that overfire and underfire air is provided. The inlet air can be provided by a pair of inlet fans 364, 366, or may be provided by a single fan with a variable valve or a diverter valve directing the air to the inlets 360, 362. The use of upper and lower air inlets can provide for better balancing or more complete combustion, and also may be desirable to assist in backflushing (i.e., with the air from underneath the filter) of the filter material 368 to prevent solids from clogging the filter material 368. As in the arrangement of FIGS. 17 and 18, a porous alumina material can be utilized for the filter 368. In accordance with a further aspect of the FIG. 19 arrangement, silicon carbide (SiC) lossies can be provided as shown at 370 to provide one or more localized hot spots during incineration. In contrast to the porous alumina filter 368, which is microwave transparent, the SiC lossies 370 will absorb microwave power, and thus will heat quite rapidly during the incineration process. As a result, rather than attempting to burn all of the material accumulated in the filter at the same time, the localized hot spots provided by the non-microwave transparent lossies 370 will cause a linear propagation of combustion (i.e., a cigarette-burn) such that the combustion process propagates progressively. The material above the lossies is first dried and then combusted, with the combustion process then progressing until completed as the solid material disposed on the transparent alumina filter combusts. This propagating burn has been recognized as desirable in avoiding thermal runaway instability.

In FIG. 19A, liquid enters as shown at 372, and exits at 374 (drawn by a pump, not shown). Further, the microwaves enter the chamber 373 as shown at 376. 378 designates the exhaust gas outlet. If desired, an openable service access port can be provided as shown at 380. As also shown in FIG. 19A, an optional silicon carbide air filter 382 can be provided which operates in a manner similar to a catalytic converter, and which provides an open cell silicon cellular or honeycomb-type arrangement in which carbon particles are flashed off by microwaves during the incineration process. The optional filter 382 can thus provide for a final scrubbing of the air before it exits through the exhaust outlet 378. This optional filter is also helpful in reducing odors in the exhaust. An activated carbon or activated charcoal filter can also be utilized with the filter 382 to reduce odors.

FIG. 19B shows an arrangement similar to that shown in FIG. 19A, with the arrangement of FIG. 19B orthogonal with respect to that shown in FIG. 19A. With respect to FIG. 19B, the microwaves will enter from above the filter assembly, with a hot spot provided at 432 by a lossy (e.g., SiC) at the front end of the flow, with a porous ceramic or graphite filter provided as shown at 434. In addition, an activated carbon or charcoal air filter can be provided as shown at 436. Such a charcoal air filter is particularly advantageous in reducing odors in the exhaust, and when the assembly is subjected to microwaves, the microwaves reactivate the charcoal air filter. The liquid material will enter as shown at 438, and will pass through the ceramic or graphite filter 434, and then pass through the activated charcoal filter 436, with both the liquid and air outlets provided downstream of the filter 436, for example, by a three-way valve or diverter valve. More particularly, the valve downstream of the filter 436 will provide communication to the subsequent liquid treatment or drain while liquid is entering and passing through the filter assembly, while the valve is positioned to provide communication with an air exhaust during treatment with microwaves (during which liquid is not passing through the filter assembly).

The assembly of FIG. 19C can be utilized in the microwave filter assembly of the liquid treatment system, however such an arrangement can also be utilized for retaining solids in the fire tube of the solid treatment system. In the arrangement of FIG. 19C, the microwaves will enter perpendicular to the filter as designated generally at 450, and the solids (designated at 452) will be retained by a substrate filter which can be formed as a ceramic substrate filter, a pure alumina filter, or a graphite filter. The substrate filter 454 will have a fine porous structure for the filter assemblies 326, 328, 326', 328' (FIGS. 16A and B), while a more coarse (more open) porous structure or a cellular structure can be utilized for the roughing filters 536, 538 (FIG. 16B), or in the fire tube. The microwave source will be positioned such that the microwaves are focused on the load which is retained above the surface of the filter 454, and the exhaust flow will be downstream of the filter 454, such that both the exhaust air and the draining liquids pass through the filter 454 (as discussed earlier, the same outlet valve can be utilized for both the liquid and exhaust, with the valve providing an exhaust communication at a first position, and a liquid communication in a second position). Of course, as the microwave treatment progresses, the moisture within the solids trapped by the filter change, thus changing the dielectric properties of the solids. It is important to focus the microwaves at the location of the load retained on the filter to provide complete combustion or burning.

Figure 19G:
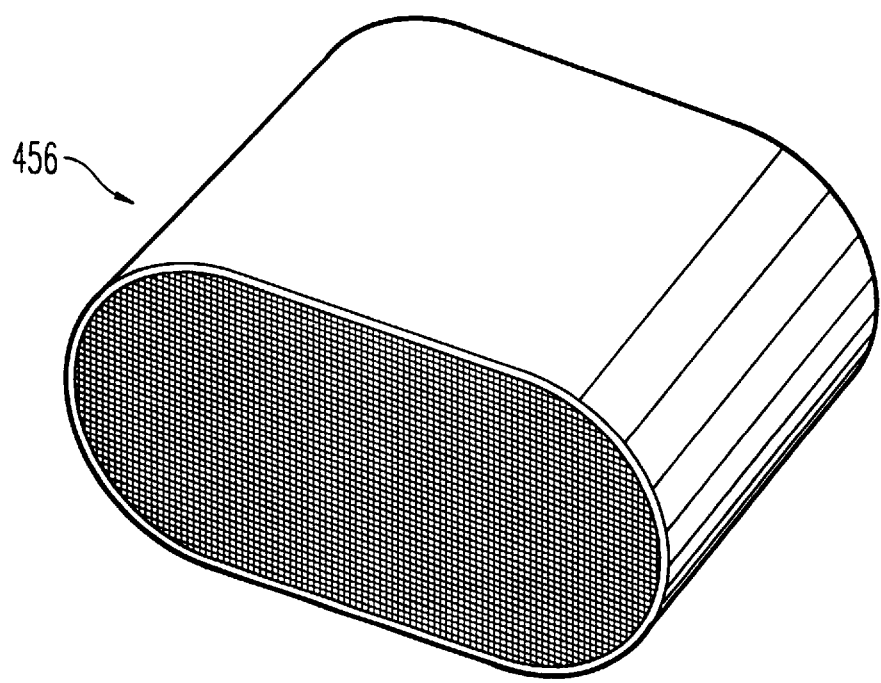
FIG. 19G is a perspective view of a honeycomb or cellular structure which can be utilized in a microwave filter assembly of the present invention.

Referring briefly to FIG. 19G, a cellular or honeycomb structure 456 is shown, which can be utilized for retaining solids thereon, while allowing liquids to drain therethrough as shown, e.g. at 454 in FIG. 19C (of course the sizes of the honeycombs will vary depending upon the location at which the filter is utilized, and whether the honeycomb structure is utilized in the solid treatment module, or in the liquid treatment module). Further, such a honeycomb structure can be utilized for an air outlet filter (e.g., as shown at 382 in FIG. 19A).

In the arrangement of FIG. 19D, a lossy plate 458 is provided spaced above the ceramic porous or cellular substrate filter material 460 by a spacing of, e.g., ⅜ of an inch for a liquid filter, such that the flow F passes over the plate 458, with some of the solids deposited on the plate 458, while other solids are deposited on the filter 460. The lossy serves as a high temperature region thus burning any solids which are deposited on the plate 458 while also burning any solids which are deposited on the substrate filter therebelow. The spacing 462 is selected such that the flow is allowed to pass over the plate and to the filter, while being sufficiently close to burn any solids which are deposited on the filter 460. The plate 458 may be solid, or may include relatively large holes or cell openings to prevent any pressure buildup between the plate and the cell during combustion and/or to control the amount of and location of heated regions in the assembly. As in the arrangement of FIG. 19C, the microwave energy is represented at 450.

FIG. 19E shows an arrangement in which the filter 464 is a combined porous filter and lossy, including microwave transparent and microwave absorptive materials. Such an arrangement can be provided by providing a lossy material in selected portions of the porous ceramic filter, or by utilizing a coating on portions of a honeycomb or porous filter material. In addition, an oxide bonded silicon carbide (OBSiC) material can be utilized which is microwave absorptive, highly thermally conductive, heat resistant and uniform, as the material forming the filter 464 (with the filter having either a porous or cellular configuration).

FIG. 19F shows an arrangement in which the solids 466 are trapped by a ceramic or graphite porous or coarse filter 468, with a lossy plate (solid or having perforations or apertures therein) disposed between the filter 468 and an activated charcoal filter 472. For liquid treatment, the ceramic filter will be of a porous material, while the activated charcoal filter 472 will have a honeycomb configuration. The filter substrate 468 can also be of a porous or honeycomb structure for the solid treatment fire tube, with a honeycomb activated charcoal filter 472. The honeycomb configuration can be provided with or without a catalytic (noble metal) coating. The air exhaust will preferably be downstream of the filter assembly as discussed with respect to the earlier assembly arrangements, and the activated charcoal filter thus provides for further filtration of exhaust gases and odor reduction. The lossy 470 absorbs microwave energy to thereby assist in burning of the waste 466, and also for burning of any particulate material which may be trapped in the air filter or activated charcoal filter 472, and also to assist in reactivating the filter 472. Thus, the microwave radiation both drys and reactivates the charcoal filter to renew the charcoal filter.

Figure 20:
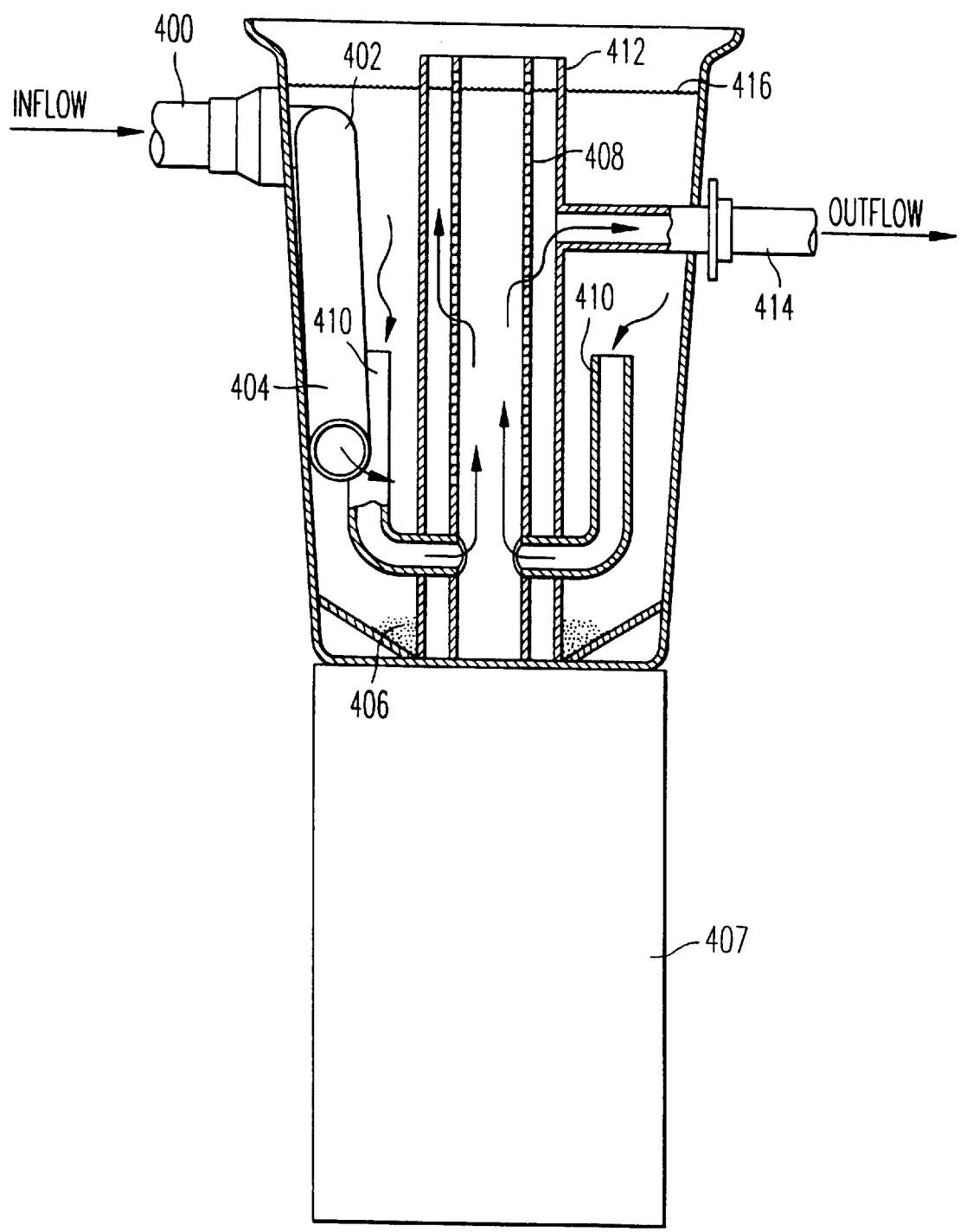
FIG. 20 is a side schematic view of a clarification chamber for the liquid treatment system.
Figure 21:
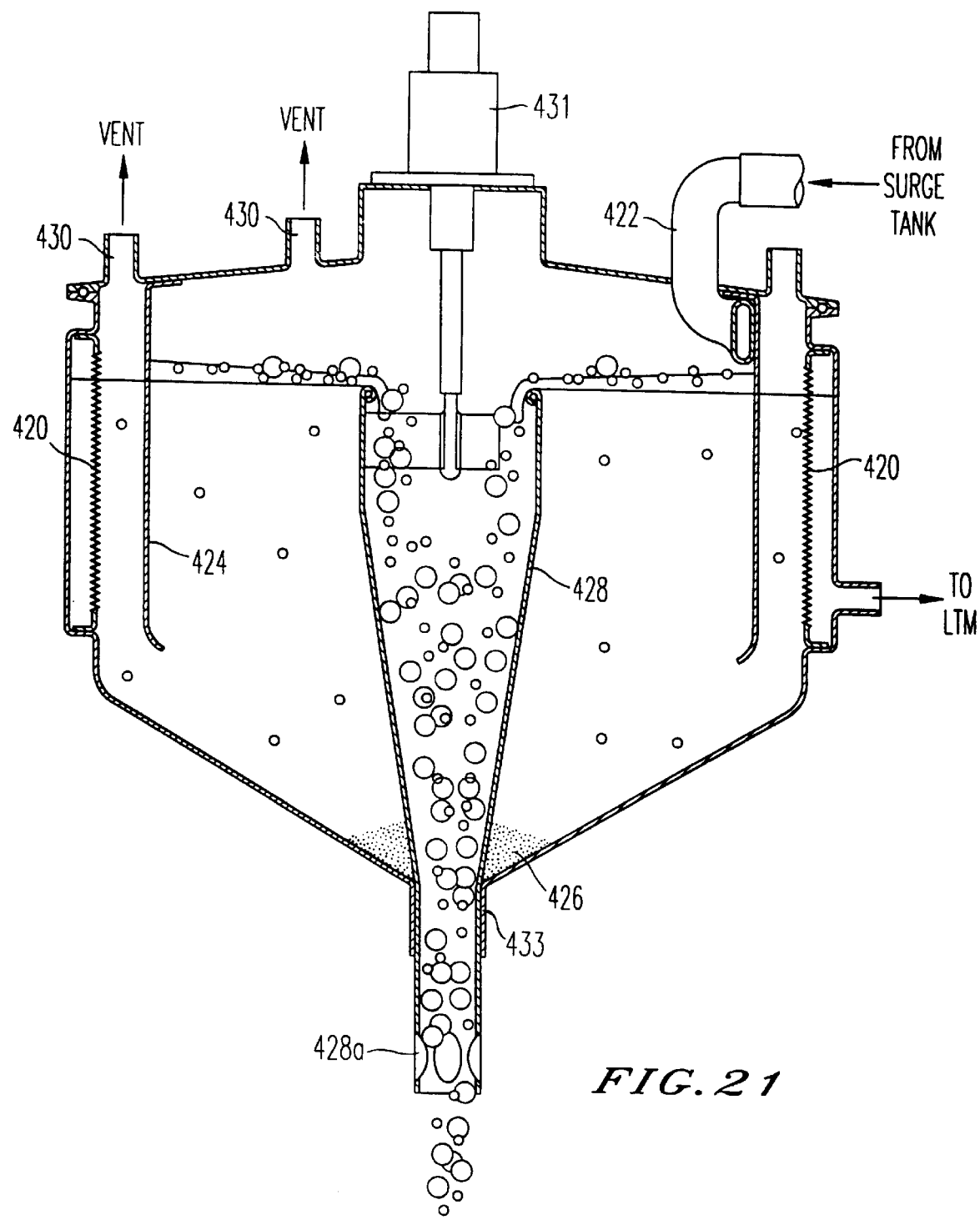
FIG. 21 is an alternate clarification chamber embodiment.

Referring now to FIGS. 20 and 21, arrangements for the clarification chamber (shown at 240 in FIG. 16A) will now be described. In the arrangement of FIG. 20, the flow from the surge tank enters through an inlet 400, passes through a first elbow 402, and then enters the clarification chamber after passing through a second elbow 404, such that a spiral flow is achieved as the liquid enters the clarification chamber. The spiral flow causes heavier particles and sediments to pass towards the center of the chamber and drop to the bottom as shown at 406. This material (as well as material dropping from the filters 408) is then periodically pumped, for example by a moyno pump, back to the fire tube via the separator. Element 407 generally designates a stand or support structure. One or more inlets are also provided as shown at 410 to draw liquid from the clarification chamber into a central tubular column 412. The liquid enters the central tubular column 412, which includes a cylindrical filter 408 therein such that the liquid must pass through the cylindrical filter 408 prior to passing to the exit 414. The filter 408 can be of a conventional design, for example a filter utilized in a conventional septic tank having ¹⁄₁₆–¹⁄₃₂ inch filter slots will be acceptable. Such filters are available from Zoeller Pump Company, and are self-cleaning such that during periods of low flow or no flow, particles trapped by the filter 408 will drop down to the bottom of the clarification chamber, where the particles can be removed periodically with the moyno pump. The filter 408 thus traps fine vegetable matter, hair or larger particles, and prevents same from passing to the exit 414, which then goes to the filter chambers as discussed earlier. Floatables may be present in the clarification chamber at the top of the liquid as indicated at 416. The tubular column 412 provides a barrier such that the solid/particulate material in the filter is not subjected to the spiral flow, which could cause emulsification of the solids. Once the liquid level is sufficiently high, the floatables will pass over the tubular column 412, and thus, can be filtered or scalped from the top of the liquid within the clarification chamber.

FIG. 21 shows an alternate arrangement in which the filter 420 (which as with the filter 408 of FIG. 20 can be of a conventional design, for example, as manufactured by Zoeller) is disposed at an outer periphery of the clarification chamber. As in the FIG. 20 arrangement, the inlet flow from the surge tank forms a spiral flow within the clarification chamber via the inlet as shown at 422. A baffle or barrier structure 424 extends about the periphery of the clarification chamber. With this arrangement, as in the FIG. 20 arrangement, the swirling or spiral action within the surge tank causes the heavier particles to drop towards the bottom of the clarification tank as indicated at 426, however a low turbidity or unforced flow passes through the filters 420 such that particles are not forced or broken down to pass through the filters 420. Floating material at the top of the liquid are scalped as they pass over a central column or conical drain 428. The floatable discharge and the particles settling as shown at 426 are pumped, for example with a moyno pump, to the fire tube via the separator as discussed earlier. As shown at 431, an actuator/piston assembly is provided which is connected to the drain 428 at 431*a*. Thus, the actuator vertically moves the drain 428, such that in a lower position (i.e., the position shown in FIG. 21) the floatables on top of the liquid pass into the drain. Periodically, the drain 428 is then raised by actuator 431 until apertures 428*a* at the bottom of the drain are above the lower sleeve 433 of the clarification chamber, such that the settled particles 426 pass through the apertures 428*a*.

The system is vented as shown at 430 (FIG. 21), and the vents can be connected to the variable speed exhaust as utilized in the solid treatment module. The FIG. 20 system also includes an enclosed vented cover (not shown in FIG. 20). The fan will slowly draw the gases from the clarification chamber such that a venting action is provided. The system is neither pressurized nor depressurized, but the venting removes gases generated in the clarification chamber.

Figure 22:
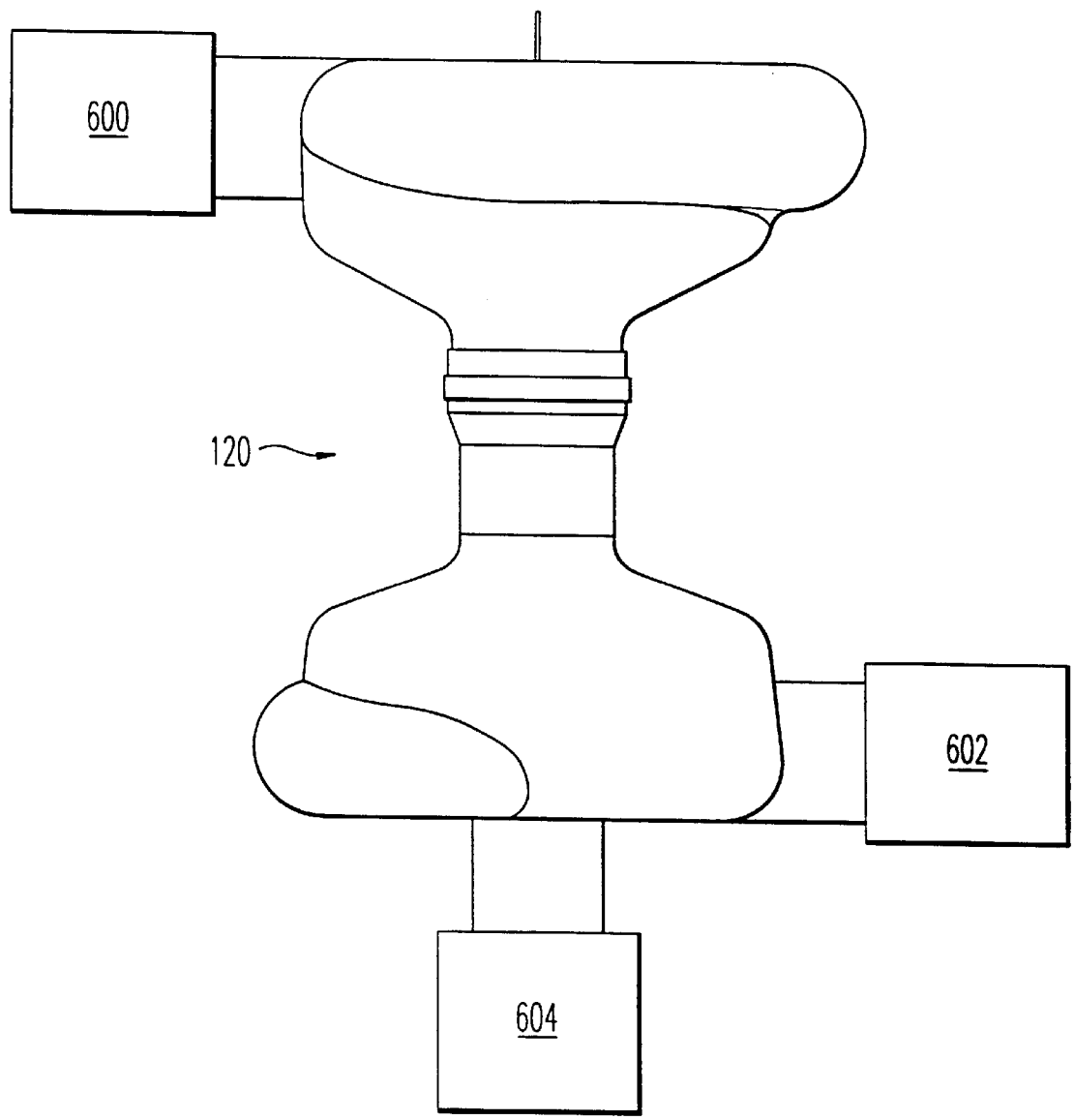
FIG. 22 schematically depicts a system utilizing the separator of the present invention.

FIG. 22 schematically represents the use of the separator 120 in systems other than for waste treatment. For example, as shown in FIG. 22, the separator can receive an outlet from a pulp and paper mill indicated at 600, and can be utilized to remove usable pulp or fiber, with the liquid outlet connected to the waste discharge system 602 of the pulp and paper mill and the solid outlet connected to a digester at which the small wood particles or fibers (or possibly pulp) are further digested or processed to provide usable pulp which can be utilized in paper making as designated at 604. Thus, it should be appreciated that the separator can be utilized for the separation of a wide variety of materials, and processing other than incineration can be provided as shown at 604, for example, processing of one or more of pulp, wood particles, or wood fiber which is separated from the remainder of the flow by the separator 120. The separator is also usable in a wide variety of applications such as in food processing, in the beverage industry, chemical processing, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A treatment system comprising:
    means for removing solids from a stream to produce a stream of clarified liquid;
    a microwave filter assembly having an inlet receiving said stream of clarified liquid, said microwave filter assembly further including a filter element for removing and retaining suspended particles from said stream of clarified liquid and allowing filtered liquid of said stream of clarified liquid to pass through said filter element, and wherein said filter element includes a ceramic material, said microwave filter assembly further including microwave means for incinerating the suspended particles removed and retained by said filter element with microwaves; and
    means for mixing said filtered liquid passing through said filter element with at least one oxidant, said means for mixing disposed downstream of said microwave filter assembly such that said at least one oxidant is mixed with said filtered liquid after said filtered liquid passes through said filter assembly.

2. The treatment system of claim 1, further including a lossy material disposed at least one of upstream of said filter element and downstream of said filter element.

3. The treatment system of claim 1, wherein said filter element is formed of a ceramic and a lossy material.

4. The treatment system of claim 3, wherein said filter element is formed of an oxygen bonded silicon carbide material.

5. The treatment system of claim 1, wherein said microwave filter assembly includes a pair of filter chambers each having one of said filter elements disposed therein, the microwave filter assembly further including valve means to selectively supply the clarified liquid to one of said pair of filter chambers at a time;
    the microwave filter assembly further including control means for controlling said valve means and said microwave means such that when one of said filter elements is isolated for cleaning by said microwave means, the clarified liquid is directed to the other of said filter chambers.

6. The treatment system of claim 1, further including means for subjecting said filtered liquid to at least one of ultraviolet radiation and microwave radiation, to provide radiation for enhancing effectiveness of said at least one oxidant.

7. The treatment system of claim 1, further including means for forming a treatment liquid which includes at least one oxidant, and wherein said means for mixing mixes said treatment liquid with said filtered liquid.

8. The treatment system of claim 7, wherein said means for forming said treatment liquid which includes at least one oxidant includes means for generating a low pH oxidant liquid and a high pH liquid, and wherein said means for mixing mixes the low pH oxidant liquid with said filtered liquid, the treatment system further including radiation means for subjecting said filtered liquid and said low pH oxidant liquid to one of ultraviolet radiation and microwave radiation, and means for combining said high pH liquid with said filtered liquid and said low pH liquid.

9. The treatment system of claim 1, wherein said means for removing includes a clarification chamber, and wherein said clarification chamber includes inlet means for introducing a tangential liquid flow into said clarification chamber to produce a swirling flow in said clarification chamber.

10. The treatment system of claim 9, wherein said clarification chamber further includes barrier means and filter means, said barrier means separating said filter means from the swirling flow in said clarification chamber, and wherein said filter means is disposed between said barrier means and a liquid outlet of said clarification chamber.

11. The treatment system of claim 9, further including a surge tank.

12. The treatment system of claim 1, wherein said means for removing includes a clarification filter element.

13. The treatment system of claim 12, wherein said clarification filter element includes a coarse microwave filter assembly having a coarse ceramic filter, and microwave means for subjecting said coarse ceramic filter to microwave radiation.

14. The treatment system of claim 12, wherein said coarse microwave filter assembly includes a pair of coarse filter chambers each having a coarse ceramic filter, and means for subjecting said coarse ceramic filters to microwave radiation.

15. The treatment system of claim 12, further including a surge tank disposed upstream of said means for removing.

16. The treatment system of claim 1, further including a brine supply and a mixed oxidant cell which receives a brine solution from said brine supply and generates a treatment liquid which includes at least one oxidant, and wherein an outlet of the mixed oxidant cell is connected to said means for mixing.

17. The treatment system of claim 1, wherein said treatment liquid which includes at least one oxidant includes at least one of ozone and hydrogen peroxide.

18. The treatment system of claim 1, further including a suction pump downstream of said microwave filter assembly for drawing said filtered liquid through said filter assembly, said suction pump disposed upstream of said means for mixing.

19. The treatment system of claim 1, further including an air inlet to said microwave filter assembly and means for preheating air entering said air inlet, said means for preheating utilizing heat from said microwave means.

20. A treatment system as recited in claim 1, further including a screen for delimiting a microwave chamber within said microwave filter assembly, said screen disposed below said filter element and within said microwave filter assembly.

21. A treatment system as recited in claim 1, further including an exhaust outlet passageway extending from said microwave filter assembly, the treatment system further including a variable speed fan disposed along said exhaust outlet passageway.

22. A treatment system as recited in claim 1, wherein said means for removing includes a separator.

23. A treatment system as recited in claim 1, wherein said microwave means introduces microwave energy into said microwave filter assembly at a location above said filter element and through an aperture of a housing of said microwave filter assembly, and wherein a screen is disposed below said filter element for delimiting a microwave chamber within said microwave filter assembly.

24. A treatment system as recited in claim 1, wherein said microwave filter assembly allows said filtered liquid to pass therethrough while removing and retaining said suspended particles on said filter element without stirring the material inside of the microwave filter assembly.

25. A treatment system comprising:
   means for removing solids from a stream to produce a stream of clarified liquid;
   a microwave filter assembly having an inlet receiving said stream of clarified liquid, said microwave filter assembly including:
      (a) a housing defining a cavity therein;
      (b) a filter element disposed in said cavity for removing and retaining suspended particles from said stream of clarified liquid and allowing filtered liquid of said stream of clarified liquid to pass through said filter element;
      (c) a screen disposed below said filter element and inside of said cavity, said screen delimiting a microwave chamber within said cavity; and
      (d) microwave means for incinerating the suspended particles removed and retained by said filter element with microwaves, said microwave means introducing microwave energy into said cavity at a location above said filter element, and wherein said microwave means introduces microwave energy through an aperture in said housing.

26. A treatment system as recited in claim 25, further including means for introducing an oxidant into said filtered liquid passing through said microwave filter assembly, said means for introducing disposed downstream of said microwave filter assembly; and
   means for subjecting said filtered liquid to at least one of ultraviolet radiation and microwave radiation at a location downstream of said microwave filter assembly, such that said means for subjecting enhances effectiveness of said oxidant.

27. A treatment system as recited in claim 26, wherein said means for removing includes a clarification chamber disposed upstream of said microwave filter assembly, and a surge tank disposed upstream of said clarification chamber.

28. A treatment system as recited in claim 27, wherein said clarification chamber is a cyclonic clarification chamber.

29. A treatment system as recited in claim 25, wherein said microwave filter assembly allows said filtered liquid to pass therethrough while removing and retaining the suspended particles on said filter element without stirring the material inside of the microwave filter assembly.

30. A treatment system comprising:
   means for removing solids from a stream to produce a stream of clarified liquid;
   a microwave filter assembly having an inlet receiving a said stream of clarified liquid, said microwave filter assembly further including a filter element for removing and retaining suspended particles from said stream of clarified liquid and allowing filtered liquid of said stream of clarified liquid to pass through said filter element, and wherein said microwave filter assembly further includes microwave means for incinerating the suspended particles removed and retained by said filter element to with microwaves;
   means for introducing at least one oxidant into the filtered liquid passing through said filter element, said means for introducing disposed downstream of said microwave filter assembly and introducing said at least one oxidant into the filtered liquid after exiting said microwave filter assembly; and
   means for subjecting the filtered liquid to at least one of ultraviolet radiation and microwave radiation at a location downstream of said microwave filter assembly.

31. A treatment system as recited in claim 30, wherein said means for removing includes a clarification chamber disposed upstream of said microwave filter assembly and a surge tank disposed upstream of said clarification chamber.

32. A treatment system as recited in claim 30, wherein said microwave filter assembly includes a cavity within which said filter element is disposed;
   said microwave filter assembly further including a screen disposed in said cavity and below said filter element, said screen delimiting a microwave chamber within said cavity.

33. A treatment system as recited in claim 30, wherein said microwave filter assembly allows the filtered liquid to pass therethrough while removing and retaining the suspended particles on said filter element without stirring the material inside of the microwave filter assembly.

34. A treatment system as recited in claim 30, wherein said means for removing includes a separator.

* * * * *